US012134269B2

(12) United States Patent
Nomura

(10) Patent No.: US 12,134,269 B2
(45) Date of Patent: Nov. 5, 2024

(54) LIQUID EJECTING APPARATUS

(71) Applicant: CANON KABUSHIKI KAISHA, Tokyo (JP)

(72) Inventor: Hiroyasu Nomura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 125 days.

(21) Appl. No.: 17/935,025

(22) Filed: Sep. 23, 2022

(65) Prior Publication Data

US 2023/0101931 A1 Mar. 30, 2023

(30) Foreign Application Priority Data

Sep. 28, 2021 (JP) ................................. 2021-158381

(51) Int. Cl.
*B41J 2/045* (2006.01)
*B41J 2/14* (2006.01)

(52) U.S. Cl.
CPC ......... *B41J 2/04563* (2013.01); *B41J 2/0458* (2013.01); *B41J 2/14153* (2013.01)

(58) Field of Classification Search
CPC ... B41J 2/04563; B41J 2/0458; B41J 2/14153
See application file for complete search history.

(56) References Cited

U.S. PATENT DOCUMENTS

2011/0164085 A1* 7/2011 Takabayashi .......... B41J 2/0458 347/17
2021/0016570 A1* 1/2021 Goto .................... B41J 2/14427

FOREIGN PATENT DOCUMENTS

JP 6388372 B2 9/2018

* cited by examiner

*Primary Examiner* — Scott A Richmond
(74) *Attorney, Agent, or Firm* — Canon U.S.A., Inc. IP Division

(57) ABSTRACT

A liquid ejecting apparatus with a recording element substrate including an ejection port that ejects liquid, and a heating element that heats the liquid in order to eject the liquid from the ejection port; and at least a first temperature detecting element and a second temperature detecting element. The first temperature detecting element and the second temperature detecting element are formed at target positions centered on the center of the heating element when the recording element substrate is viewed in plan view.

11 Claims, 15 Drawing Sheets

LIQUID EJECTING APPARATUS

BACKGROUND

Field of the Disclosure

The present disclosure relates to a liquid ejecting apparatus that ejects liquid.

Description of the Related Art

As a system that ejects liquid (ink) from an ejection port to perform recording on a recording medium such as paper, a thermal type liquid ejecting apparatus is known, which ejects ink from an ejection port with thermal energy generated by a heating element (heater) that heats liquid.

Japanese Patent No. 6388372 discloses a configuration in which two temperature detecting elements (temperature sensors) are provided for one heater in a thermal type liquid ejecting apparatus. By comparing the magnitude relationship between output signals from the two temperature sensors, it can be determined whether liquid is normally ejected from an ejection port. Hereinafter, a state in which liquid is normally ejected is referred to as a normal ejection state, and a state in which liquid is not normally ejected is referred to as an ejection failure state.

Specifically, in Japanese Patent No. 6388372, for example, one of the temperature sensors is disposed at the center of the heater and the other temperature sensor is disposed at the periphery of the heater as viewed in plan view. A voltage applied between both terminals of the temperature sensor disposed at the center of the heater is V1. A voltage applied between both terminals of the temperature sensor disposed at the periphery of the heater is V2. A comparator compares V1 with V2. A time period when V1 is greater than V2 is considered to be an ejection failure state and a time period when V1 is less than V2 is considered to be a normal ejection state. By using this difference, it is possible to determine whether liquid is normally ejected from the ejection port.

In the configuration described in Japanese Patent No. 6388372, even when it can be determined that the liquid ejecting apparatus is in the normal ejection state, a liquid droplet may be diagonally ejected from the ejection port (this ejection may be hereinafter referred to as misaligned ejection or diagonal ejection). Since a state in which a liquid droplet is diagonally ejected may cause a decrease in the recording quality, this state needs to be classified into the ejection failure state. That is, in the configuration described in Japanese Patent No. 6388372, the ejection failure state may be erroneously determined to be the normal ejection state.

SUMMARY

The present disclosure provides a liquid ejecting apparatus that can detect whether a liquid droplet is diagonally ejected.

According to the present disclosure, a liquid ejecting apparatus includes a recording element substrate including an ejection port that ejects liquid and a heating element that heats the liquid in order to eject the liquid from the ejection port. The liquid ejecting apparatus further includes at least a first temperature detecting element and a second temperature detecting element. The first temperature detecting element and the second temperature detecting element are formed at target positions centered on the heating element when the recording element substrate is viewed in plan view.

Further features of the present disclosure will become apparent from the following description of exemplary embodiments with reference to the attached drawings.

DESCRIPTION OF THE EMBODIMENTS

First Embodiment

Figure 15:
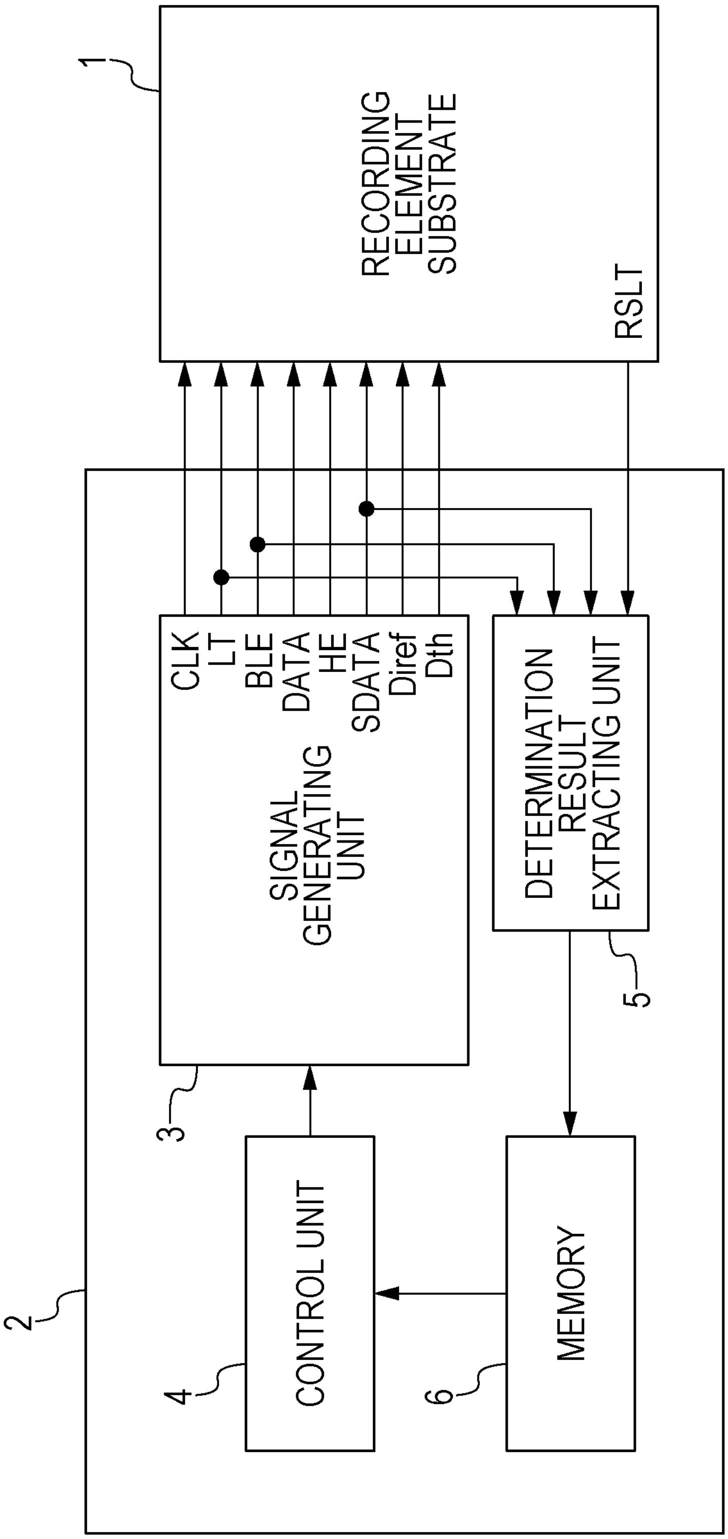
FIG. 15 is a block diagram illustrating a control configuration of a liquid ejecting apparatus.

The present embodiment is described below with reference to the drawings. FIG. 15 is a block diagram illustrating a control configuration of a diagonal ejection inspecting apparatus 2 that inspects whether liquid is diagonally ejected from an ejection port. A signal generating unit 3 receives an instruction from a control unit 4 and outputs a clock signal (CLK), a latch signal (LT), a block signal (BLE), a heater selection signal (DATA), and a heat-enable signal (HE) to a recording element substrate 1. Furthermore, the signal generating unit 3 outputs a sensor selection signal (SDATA), a constant current signal (Diref), a threshold signal 1 (Dth1), and a threshold signal 2 (Dth2) that are related to the selection of two temperature sensors provided for each ejection port, an amount of energization, and processing of output signals.

A determination result extracting unit 5 receives a determination result signal (RSLT) output from the recording element substrate 1 based on temperature information detected by two temperature sensors (first temperature detecting element and second temperature detecting element), and extracts a determination result in each latch period in synchronization with a falling edge of the latch signal LT.

When the determination result indicates diagonal ejection, the determination result extracting unit 5 records, in a memory 6, the block signal BLE and the sensor selection signal SDATA that correspond to the determination result.

The control unit 4 receives the block signal BLE and the sensor selection signal SDATA recorded in the memory 6 for an ejection port corresponding to the diagonal ejection. When a heater to be driven includes the ejection port corresponding to the diagonal ejection, the control unit 4 deletes information of the ejection port corresponding to the diagonal ejection from the heater selection signal DATA of a corresponding block. Then, the control unit 4 adds information of an ejection port for complementing the diagonal ejection to the heater selection signal DATA of the corresponding block instead and outputs the heater selection signal DATA to the signal generating unit 3.

Figure 1:
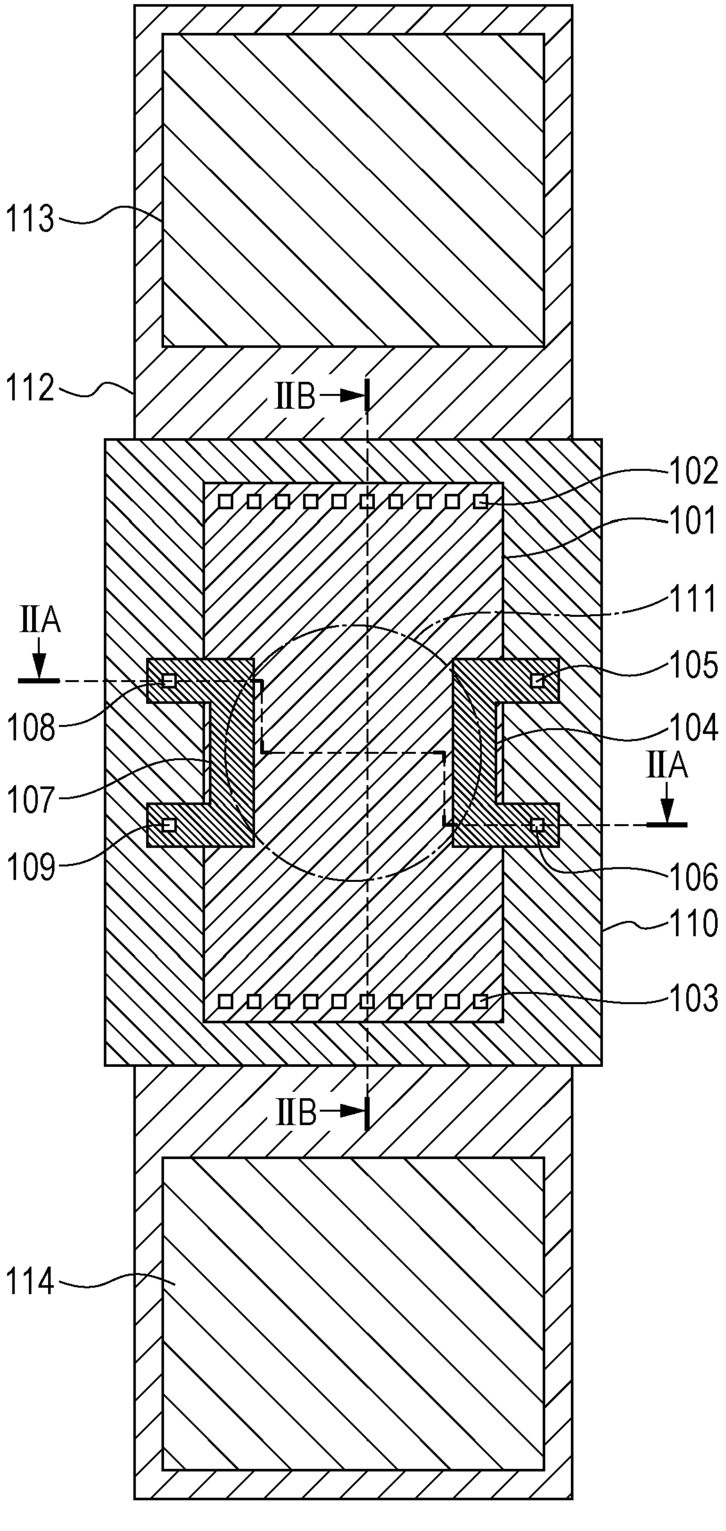
FIG. 1 is a plan view of the periphery of an ejection port.
Figure 2A:
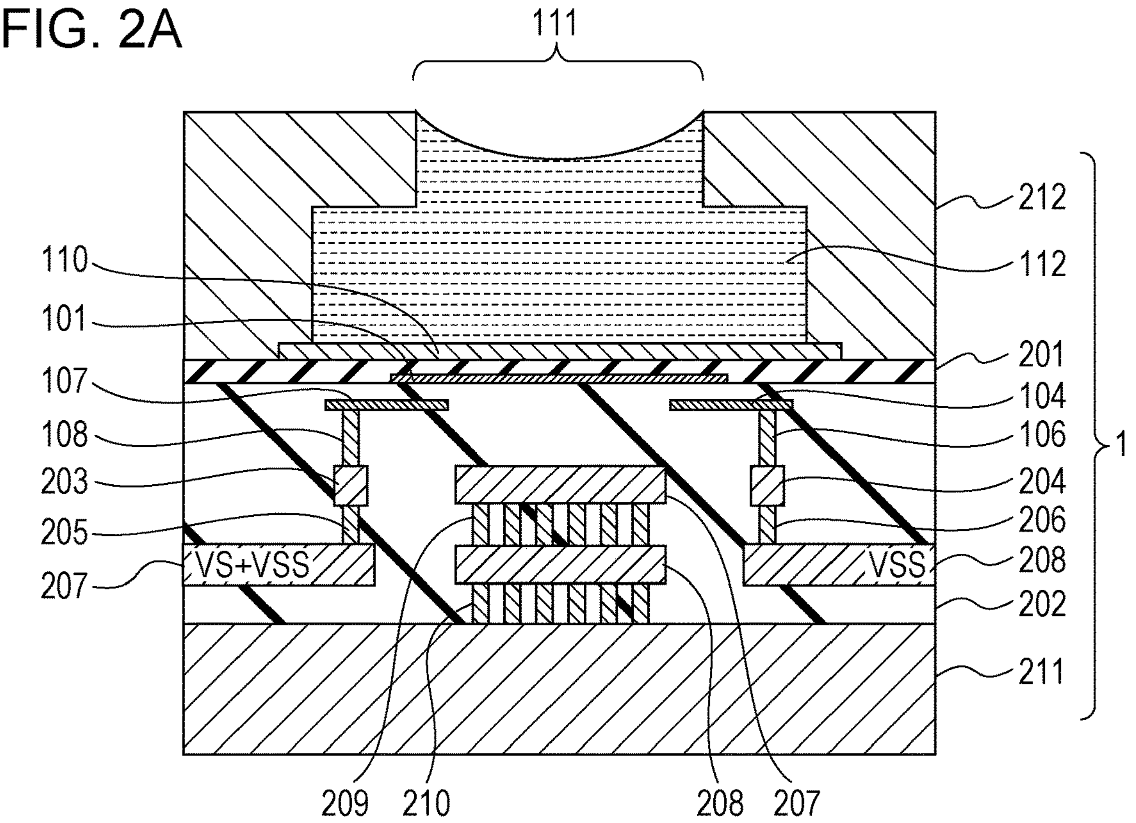
FIGS. 2A and 2B are cross-sectional views taken along lines IIA-IIA and IIB-IIB illustrated in FIG. 1.
Figure 2B:
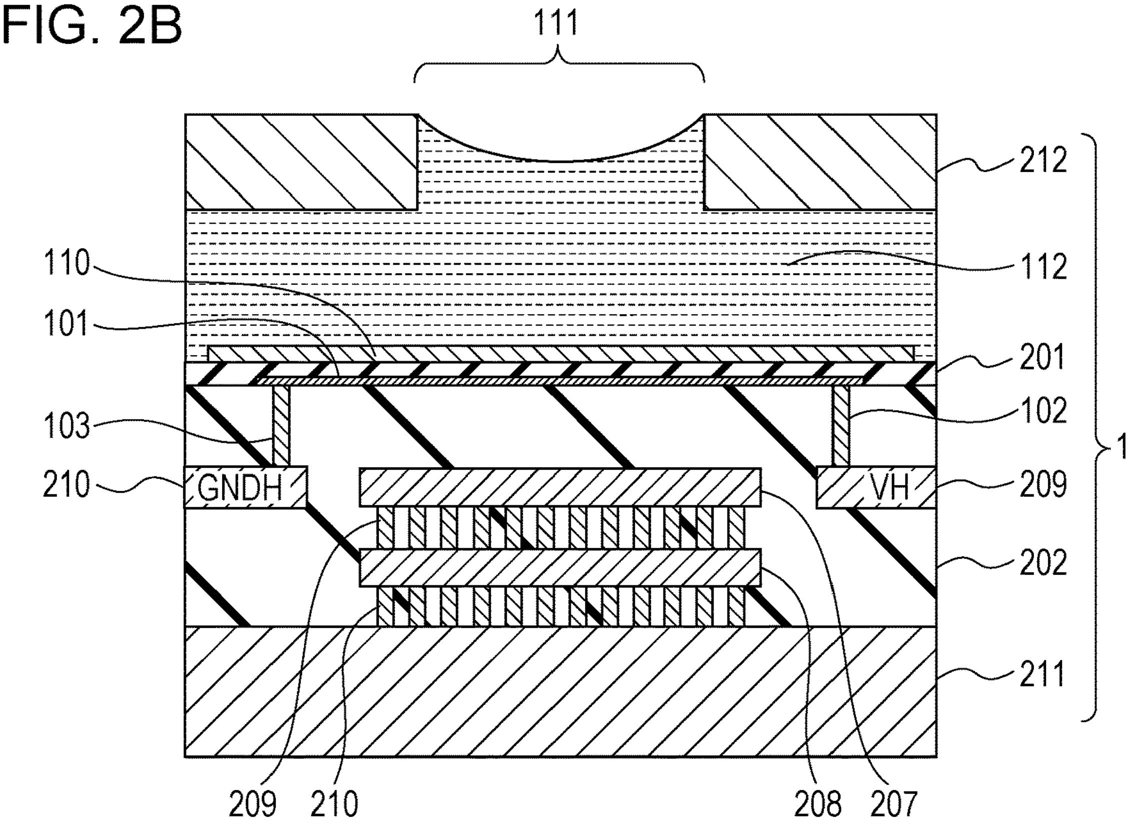

FIG. 1 is a plan view of one of a plurality of ejection ports disposed in the recording element substrate 1 according to the present embodiment as viewed in an ejection direction of ink from the substrate side. FIGS. 2A and 2B are cross-sectional views of the ejection port illustrated in FIG. 1. FIG. 2A is a cross-sectional view taken along line IIA-IIA illustrated in FIG. 1. FIG. 2B is a cross-sectional view taken along line IIB-IIB illustrated in FIG. 1. An ink flow path 112 is formed in an orifice plate 212 formed on the recording element substrate 1. An ink supply port 113 and a discharging port 114 are formed in the recording element substrate 1 in a direction perpendicular to the ink flow path 112. For one ink flow path 112, one ejection port 111 is formed on the ink flow path 112 in the orifice plate 212.

For example, a rectangular heater 101 that is a thin film resistor made of a thermally stable material, which has a high specific resistance and is TaSiN or the like, is disposed directly below the ejection port 111 in the recording element substrate 1. In addition, temperature sensors (temperature detecting elements) 104 and 107 that are thin film resistors are disposed in a lower layer present below the heater 101 via an insulating layer 202 such that parts of the temperature sensors 104 and 107 overlap the heater 101 in the vicinity of the centers of longer sides of the heater 101 in the plan view of FIG. 1. The temperature detecting element 104 (first temperature detecting element) and the temperature detecting element 107 (second temperature detecting element) are disposed so as to be symmetrical with respect to the heater 101. The symmetry indicates that the ratio of a distance from the center of the second temperature detecting element 107 to the center of the heating element 101 to a distance from the center of the first temperature detecting element 104 and the center of the heating element 101 is 0.95 or higher and 1.05 or lower when the recording element substrate is viewed in plan view. In FIG. 1, the first temperature detecting element 104 and the second temperature detecting element 107 are arranged in a transverse direction of the heating element 101. The temperature sensors 104 and 107 have a specific resistance equivalent with that of the heater 101 in order to increase output voltages, and a material having a high temperature resistance coefficient can be used for the temperature sensors 104 and 107.

A protective film 201 made of, for example, an insulator such as SiN is formed on the heater 101 and above the temperature sensors 104 and 107. A cavitation-resistant film 110 made of, for example, Ta is formed on the protective film 201 so as to cover the heater 101 in the plan view of FIG. 1.

As illustrated in FIG. 1, the temperature sensors 104 and 107 are located at positions where the temperature sensors 104 and 107 overlap the ink flow path 112 via the protective film 201 and the cavitation-resistant film 110. The recording element substrate 1 has a configuration in which a plurality of wiring layers are provided for the insulating layer 202 on a substrate 211. The insulating layer 202 is formed by laminating a plurality of interlayer insulating films. Each of the wiring layers are disposed between two of the interlayer insulating films. A semiconductor material such as silicon is used for the substrate 211. An insulating material such as silicon oxide is used for the insulating layer 202.

The heater 101 and the temperature sensors 104 and 107 are electrically connected to each other via a wiring pattern and a conductive plug disposed in the plurality of wiring layers so as to form a circuit that enables a recording function. In the embodiment, it is assumed that two wiring layers that are a first layer located closest to the substrate 211 and a second layer located above the first layer are provided.

The heater 101 is connected to a wiring pattern 209 of the second layer via a conductive plug 102 at one end of the heater 101 on a shorter side of the heater 101 and is connected to a wiring pattern 210 of the second layer via a conductive plug 103 at the other end of the heater 101. The wiring pattern 209 is connected to a power line and the wiring pattern 210 is grounded via a switching element 319 (see FIG. 3) to be described later.

As illustrated in FIG. 1, the temperature sensor 104 is connected to a predetermined wiring pattern via conductive plugs 105 and 106. For example, as illustrated in FIG. 2A, the temperature sensor 104 is connected to a pad 204 of the second layer via the conductive plug 106 disposed at one end of the temperature sensor 104 and is connected to a wiring pattern 208 of the first layer via a conductive plug 206.

The temperature sensor 107 is connected to a predetermined wiring pattern via conductive plugs 108 and 109 in a similar manner to the temperature sensor 104. For example, as illustrated in FIG. 2A, the temperature sensor 107 is connected to a pad 203 of the second layer via the conductive plug 108 disposed at one end of the temperature sensor 107 and is connected to a wiring pattern 207 of the first layer via a conductive plug 205.

In addition, a heat dissipation pattern 207 is disposed in the second layer below the heater 101. The pattern 207 is connected to a heat dissipation pattern 208 of the first layer via a plug 209. The pattern 208 is connected to the substrate 211 via a plug 210. According to this configuration, when the heater 101 is driven to generate heat and the driving is suppressed after the generation of the heat, the heat is quickly dissipated to the substrate 211.

Figure 3:
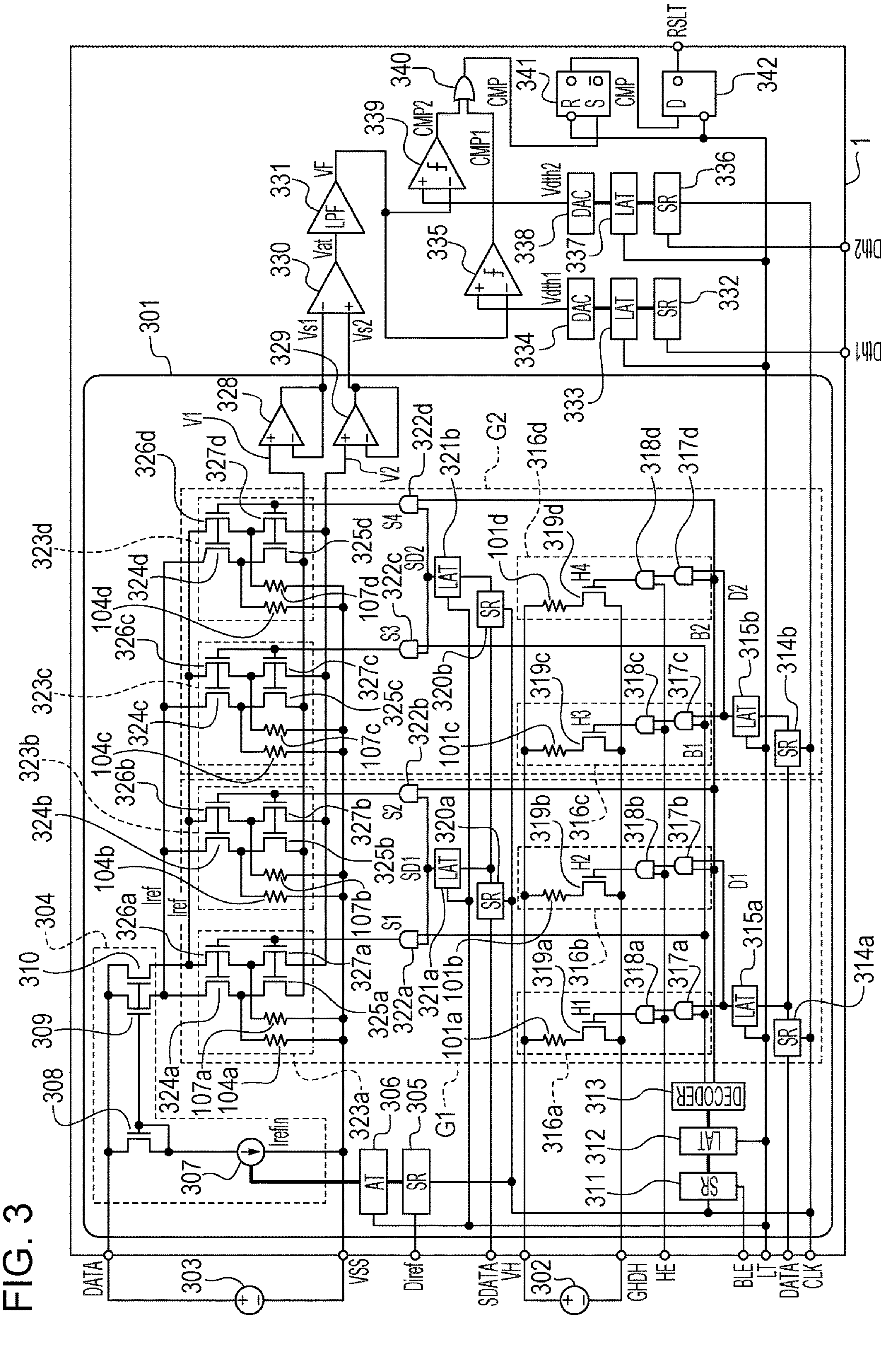
FIG. 3 is a block diagram illustrating a drive circuit and a processing circuit that processes an output signal of a temperature detecting element.

FIG. 3 is a block diagram illustrating a drive circuit for heaters implemented in the recording element substrate 1 according to the present embodiment and a processing circuit that processes an output signal of a temperature sensor. To simplify the description, it is assumed that the recording element substrate 1 includes four heaters 101*a* to 101*d* and eight temperature sensors 104*a* to 104*d* and 107*a* to 107*d* in an ejection port array 301 and that the heater 101*a* to 101*d* and the temperature sensors 104*a* to 104*d* and 107*a* to 107*d* are arrayed in the order illustrated in FIG. 3.

The recording element substrate 1 includes a constant voltage source 302 that drives the heaters 101*a* to 101*d*, a constant current source 304 that energizes the temperature sensors 104 to 104*d* and 107*a* to 107*d*, and an input and output unit (pad or terminal) that receives and outputs a signal and information from and to an external. In addition, a constant voltage source 303, which serves as a source that supplies power to the constant current source 304, applies a voltage VHTA of, for example, 5 V to the high voltage side of the constant current source 304, and applies a voltage VSS as GND to the low voltage side of the constant source 304.

The constant current source 304 includes two current sources, a constant current source 309 (first constant current source) and a constant current source 310 (second constant current source). A same current output type digital-to-analog converter (DAC) 307 serves as a reference current source and a current Tref is mirrored by a mirroring circuit 308 to the constant current sources 309 and 310 at a same amplification rate.

A switching element (MOS transistor) 319*a*, the heater 101*a*, and gate circuits 317*a* and 318*a* constitute a single drive circuit 316*a*. The switching element 319*a* controls the application of the voltage of the constant voltage source 302 to the heater 101*a*. When the switching element 319*a* is turned on, a voltage VH of, for example, 24 V is applied to the high voltage side of the heater 101*a*, and a voltage GNDH is applied to the low voltage side of the heater 101*a*. The other three heaters 101*b* to 101*d* are controlled by similar switching elements.

The temperature sensors 104*a* and 107*a* and switching elements 324*a* to 327*a* constitute a single temperature acquiring circuit 323*a*. The switching element 324*a* controls the supply of the current of the constant current source 309 to the temperature sensor 104*a*. In addition, the switching element 325*a* controls the output of a voltage generated at the temperature sensor 104*a* to a voltage follower 328. Similarly, the switching element 326*a* controls the supply of the current of the constant current source 310 to the temperature sensor 107*a*. In addition, the switching element 327*a* controls the output of a voltage generated at the temperature sensor 107*a* to a voltage follower 329.

When the switching elements 324*a* to 327*a* are simultaneously turned on, the temperature sensors 104*a* and 107*a* output, to the voltage followers 328 and 329, temperature signals to inspect a misalignment state of an ink droplet ejected from an ejection port corresponding to the heater 101*a*. The other six temperature sensors 104*b* to 104*d* and 107*b* to 107*d* are controlled by similar switching elements.

As described above, the circuit configuration illustrated in FIG. 3 includes four drive circuits 316*a* to 316*d* and four temperature acquiring circuits 323*a* to 323*d*. The four drive circuits 316*a* to 316*d* and the four temperature acquiring circuits 323*a* to 323*d* are classified into two groups G1 and G2. Each of the groups includes two of the drive circuits and two of the temperature acquiring circuits.

Figure 4:
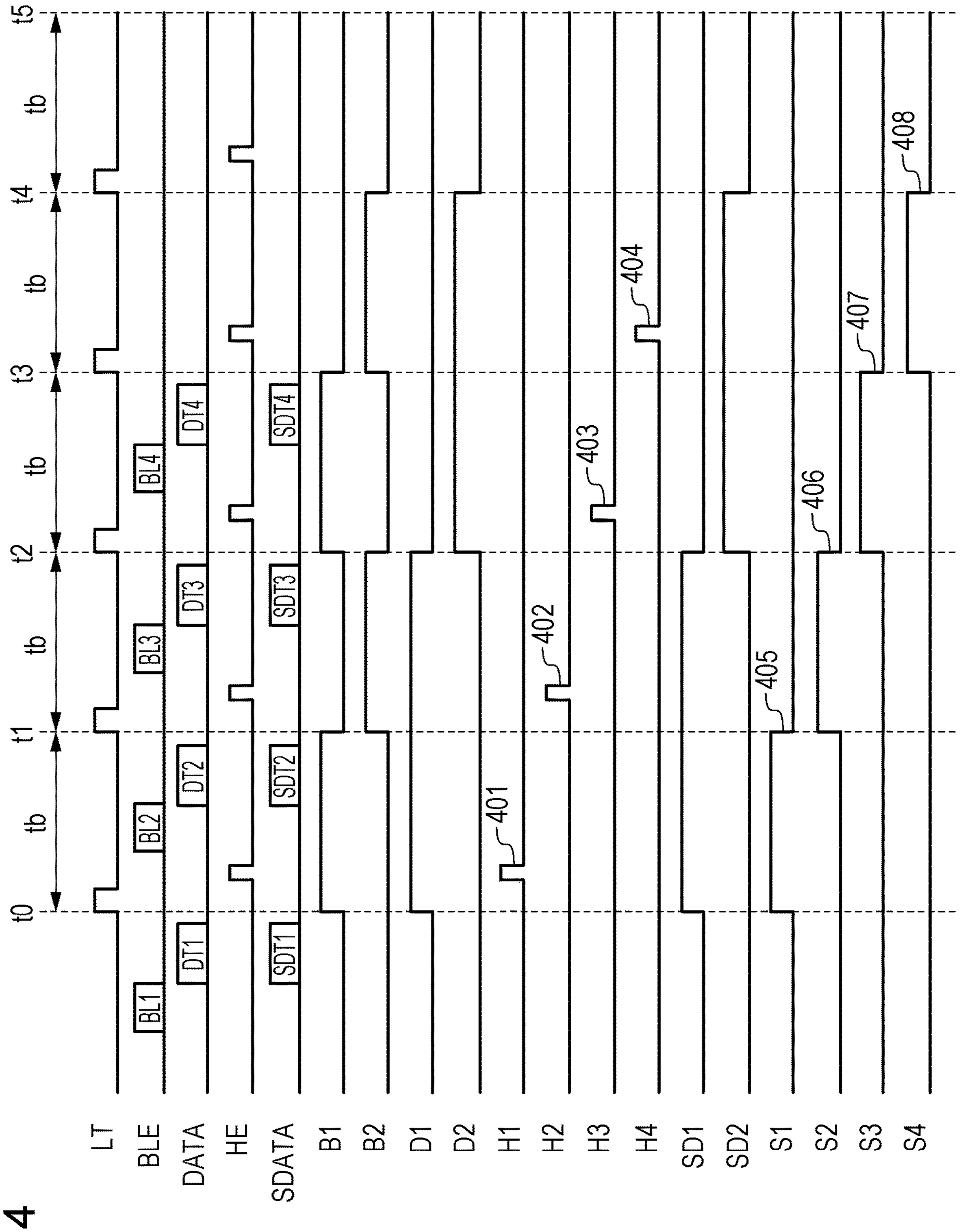
FIG. 4 is a timing chart in a logic circuit unit.

FIG. 4 is a timing chart illustrating timings of control in a logic circuit unit of the recording element substrate 1. An operation of the logic circuit unit of the recording element substrate 1 according to the present embodiment is described below with reference to FIGS. 3 and 4.

The recording element substrate 1 receives the clock signal (CLK), the latch signal (LT), the block signal (BLE), the heater selection signal (DATA), and the heat-enable signal (HE) transferred from the diagonal ejection inspecting apparatus 2. The heater selection signal (DATA) is 2-bit serial data. The block signal (BLE) is normally multi-bit serial data, but is 1-bit data in the embodiment.

Furthermore, the recording element substrate 1 also receives the sensor selection signal (SDATA), which is 2-bit serial data. The recording element substrate 1 receives the signals other than the clock signal (CLK) at intervals of a block period tb. That is, the recording element substrate 1 controls the four drive circuits 316*a* to 316*d* and the four temperature acquiring circuits 323*a* to 323*d* in two time-divided blocks, and repeats this control twice to complete the acquisition of temperature signals of the eight temperature sensors 104*b* to 104*d* and 107*b* to 107*d*.

Block signals BL1 to BL4 are transferred to a shift register 311 in synchronization with the clock signal (CLK), latched by the latch circuit 312 at time t0 to time t3, respectively, decoded by a decoder 313, and output to wirings B1 and B2. In the present embodiment, the shift register 311 is a 1-bit register. Signals of the wirings B1 and B2 are held for the block period tb to the next latch timing. In a time period when the signals of the wirings B1 and B2 are held, the next block signal is transferred to the shift register 311.

Only one of the two signals of the wirings B1 and B2 is a valid signal and is used to select heaters to be simultaneously driven. In FIG. 3, the wiring B1 is connected to the gate circuit 317*a* and a gate circuit 317*c*. Therefore, when the signal of the wiring B1 becomes valid (high active), it is possible to simultaneously drive the heaters 101*a* and 101*c*. Similarly, when the signal of the wiring B2 becomes valid, it is possible to simultaneously drive the heaters 101*b* and 101*d*.

As illustrated in FIG. 4, the present embodiment describes a case where the signal of the wiring B1 is valid for a time period from the time t0 to the time t1 and a time period from the time t2 to the time t3 and the signal of the wiring B2 is valid for a time period from the time t1 to the time t2 and a time period from the time t3 to time t4 so that the heaters are driven in the time-divided blocks.

Heater selection signals DT1 to DT4 are transferred to shift registers 314*a* and 314*b* in synchronization with the clock signal (CLK), latched by latch circuits 315*a* and 315*b* at the time t0 to the time t3, respectively, and output to wirings D1 and D2. Signals of the wirings D1 and D2 are held for the time period tb to the next latch timing. In a time period when the signals of the wirings D1 and D2 are held, the next heater selection signal is transferred to the shift registers 314*a* and 314*b*.

The signals of the wirings D1 and D2 are used to select groups G1 and G2 of the heaters.

In FIG. 1, the wiring D1 is connected to the gate circuit 317*a* and a gate circuit 317*b*. Therefore, when the signal of the wiring D1 becomes valid (high active), it is possible to select the heaters 101*a* and 101*b* of the group G1. Similarly, when the signal of the wiring D2 becomes valid (high active), it is possible to select the heaters 101*c* and 101*d* of the group G2.

The present embodiment describes a case where the heaters of the group G1 are selected in the first two blocks and the heaters of the group G2 are selected in the second two blocks. That is, the driving of the four heaters is completed in the four blocks.

The signal of the wiring B1 and the signal of the wiring D1 are input to the gate circuit 317*a*, while the signal of the wiring B2 and the signal of the wiring D1 are input to the gate circuit 317*b*. An output signal of the gate circuit 317*a* and the heat-enable signal (HE) are input to the gate circuit 318*a*, while an output signal of the gate circuit 317*b* and the heat-enable signal (HE) are input to a gate circuit 318*b*. The gate circuits 318*a* and 318*b* output pulse signals 401 and 402 to wirings H1 and H2, respectively. The wirings H1 and H2 are connected to switching elements 319*a* and 319*b*, respectively. The heaters 101*a* and 101*b* are driven according to the pulse signals 401 and 402, respectively.

Similarly, gate circuits 318*c* and 318*d* output pulse signals 403 and 404 to wirings H3 and H4, respectively. The wirings H3 and H4 are connected to switching elements 319*c* and 319*d*, respectively. The heaters 101*c* and 101*d* are driven according to the pulse signals 403 and 404, respectively.

Sensor selection signals SDT1 to SDT4 are transferred to shift registers 320*a* and 320*b* in synchronization with the clock signal (CLK), latched by latch circuits 321*a* and 321*b* at the time t0 to the time t3, respectively, and output to wirings SD1 and SD2. Signals of the wirings SD1 and SD2 are held for the time period tb to the next latch timing. In a time period when the signals of the wirings SD1 and SD2 are held, the net sensor selection signal is transferred to the shift registers 320*a* and 320*b*.

The signals of the wirings SD1 and SD2 are used to select one of groups G1 and G2 of temperature sensors corresponding to heaters to be driven. In FIG. 3, the wiring SD1 is connected to gate circuits 322*a* and 322*b*. Therefore, when the signal of the wiring SD1 becomes valid (high active), it is possible to select the temperature sensors 104*a*, 104*b*, 107*a*, and 107*b* of the group G1 as the temperature sensors corresponding to the heaters to be driven. Similarly, when the signal of the wiring SD2 becomes valid, it is possible to select the temperature sensors 104*c*, 104*d*, 107*c*, and 107*d* of the group G2 as the temperature sensors corresponding to the heaters to be driven.

As illustrated in FIG. 4, the present embodiment describes a case where the signal of the wiring SD1 is valid in the first and second blocks among the four blocks and the temperature sensors of the group G1 are selected in the first and second blocks. In addition, the present embodiment describes a case where the signal of the wiring SD2 is valid in the third and fourth blocks and the temperature sensors of the group G2 are selected in the third and fourth blocks.

The signals of the wirings B1 and B2 are also used as block signals to select temperature sensors. That is, the signal of the wiring SD1 and the signal of the wiring B1 are input to the gate circuit 322*a*, while the signal of the wiring SD1 and the signal of the wiring B2 are input to the gate circuit 322*b*. Similarly, the signal of the wiring B1 and the signal of the wiring SD2 are input to the gate circuit 322*c*, while the signal of the wiring B2 and the signal of the wiring SD2 are input to the gate circuit 322*d*.

A set value Diref of a constant current Iref is defined as a 5-bit digital value that can be set in 32 steps. The set value Diref of the constant current Iref is transferred to a shift register 305 in synchronization with the clock signal CLK. Then, the set value Diref of the constant current Iref is latched by a latch circuit 306 in synchronization with the latch signal LT and output to the current output type digital-to-analog converter (DAC) 307. That is, the DAC 307 outputs an output current Irefin based on the set value Diref.

An output signal of the latch circuit 306 is held until the next latch timing. In a time period when the output signal of the latch circuit 306 is held, the next set value Diref is transferred to the shift register 305.

The output current Irefin of the DAC 307 is mirrored to the constant current sources 309 and 310, amplified, for example, twelvefold, and output as the constant current Iref.

In the above-described manner, in the first block, a pulse signal 405 that is valid for the time period from the time t0 to the time t1 is output to a wiring S1 from the gate circuit 322*a*. The wiring S1 is connected to the switching elements 324*a* and 325*a*. The constant current Tref is supplied from the constant current source 309 to the temperature sensor 104*a* for the time period from the time t0 to the time t1 according to the pulse signal 405.

In a case where a normal temperature is T0, resistance of the temperature sensor 104*a* at the normal temperature T0 is Rs0, and the temperature resistance coefficient of the temperature sensor 104*a* is TCR, resistance Rs1 of the temperature sensor 104*a* at a temperature T1 is expressed by the following Equation (1).

$$Rs1=Rs0\cdot\{1+TCR\cdot(T1-T0)\}\tag{1}$$

A temperature signal Vs1 generated at the constant current supply side terminal of the temperature sensor 104*a* is expressed by the following Equation (2).

$$Vs1=Iref\cdot Rs1=Tref\cdot Rs0\cdot\{1+TCR(T1-T0)\}\tag{2}$$

The temperature signal Vs1 expressed by the above-described Equation (2) is output to the voltage follower 328 via a wiring V1.

In addition, the wiring S1 is also connected to switching elements 326*a* and 327*a*. The constant current Tref is supplied to the temperature sensor 107*a* from the constant current source 310 for the time period from the time t0 to the time t1 according to the pulse signal 405.

Resistance Rs2 of the temperature sensor 107*a* at a temperature T2 is expressed by the following Equation (3).

$$Rs2=Rs0\cdot\{1+TCR\cdot(T2-T0)\}\tag{3}$$

A temperature signal Vs2 generated at the constant current supply side terminal of the temperature sensor 107*a* is expressed by the following Equation (4).

$$Vs2=Iref\cdot Rs2=Iref\cdot Rs0\cdot\{1+TCR\cdot(T2-T0)\}\tag{4}$$

The temperature signal Vs2 expressed by the above-described Equation (4) is output to the voltage follower 329 via a wiring V2.

In the present embodiment, although the normal resistance values of the temperature sensors 104*a* and 107*a* are the same value Rs0, the normal resistance values may be different. In this case, the constant current sources 309 and 310 adjust constant current values to be supplied to the temperature sensors 104*a* and 107*a* such that the temperature signals Vs1 and Vs2 at the normal temperature TO are equal.

In the second block, the gate circuit 322*b* outputs, to a wiring S2, a pulse signal 406 that is valid for the time period from the time t1 to the time t2. The wiring S2 is connected to switching elements 324*b* and 325*b*. The constant current source 309 supplies the constant current Tref to the temperature sensor 104*b* for the time period from the time t1 to the time t2 according to the pulse signal 406. At the same time as the supply of the constant current Tref, a temperature signal Vs1 generated at the constant current supply side terminal of the temperature sensor 104*b* is output to the voltage follower 328 via the wiring V1.

In addition, the wiring S2 is also connected to switching elements 326*b* and 327*b*. The constant current source 310 supplies the constant current Tref to the temperature sensor 107*b* for the time period from the time t1 to the time t2 according to the pulse signal 406. At the same time as the supply of the constant current Tref, a temperature signal Vs2 generated at the constant current supply side terminal of the temperature sensor 107*b* is output to the voltage follower 329 via the wiring V2.

In the third block, the gate circuit 322*c* outputs, to a wiring S3, a pulse signal 407 that is valid for the time period from the time t2 to the time t3. The wiring S3 is connected to switching elements 324*c* and 325*c*. The constant current source 309 supplies the constant current Tref to the temperature sensor 104*c* for the time period from the time t2 to the time t3 according to the pulse signal 407. At the same time as the supply of the constant current Iref, a temperature signal Vs1 generated at the constant current supply side terminal of the temperature sensor 104*c* is output to the voltage follower 328 via the wiring V1.

In addition, the wiring S3 is also connected to switching element 326*c* and 327*c*. The constant current source 310 supplies the constant current Iref to the temperature sensor 107*c* for the time period from the time t2 to the time t3 according to the pulse signal 407. At the same time as the supply of the constant current Iref, a temperature signal Vs2 generated at the constant current supply side terminal of the temperature sensor 107*c* is output to the voltage follower 329 via the wiring V2.

In the fourth block, the gate circuit 322*d* outputs, to a wiring S4, a pulse signal 408 that is valid for the time period from the time t3 to the time t4. The wiring S4 is connected to switching elements 324*d* and 325*d*. The constant current source 309 supplies the constant current Iref to the temperature sensor 104*d* for the time period from the time t3 to the time t4 according to the pulse signal 408. At the same time as the supply of the constant current Iref, a temperature signal Vs1 generated at the constant current supply side terminal of the temperature sensor 104*d* is output to the voltage follower 328 via the wiring V1.

In addition, the wiring S4 is also connected to switching elements 326*d* and 327*d*. The constant current source 310 supplies the constant current Iref to the temperature sensor 107*d* for the time period from the time t3 to the time t4 according to the pulse signal 408. At the same time as the supply of the constant current Iref, a temperature signal Vs2 generated at the constant current supply side terminal of the temperature sensor 107*d* is output to the voltage follower 329 via the wiring V2.

When the temperature signals Vs1 and Vs2 are directly input to the differential amplifier 330 (differential signal output unit), the resistance of the switching elements is affected by input impedance of the differential amplifier 330, the temperature signals Vs1 and Vs2 drop in voltage and are input to the differential amplifier 330. Therefore, the temperature signals Vs1 and Vs2 are temporarily received by the voltage followers 328 and 329 included in the ejection port array 101, respectively, and are input to the differential amplifier 330.

Figure 5:
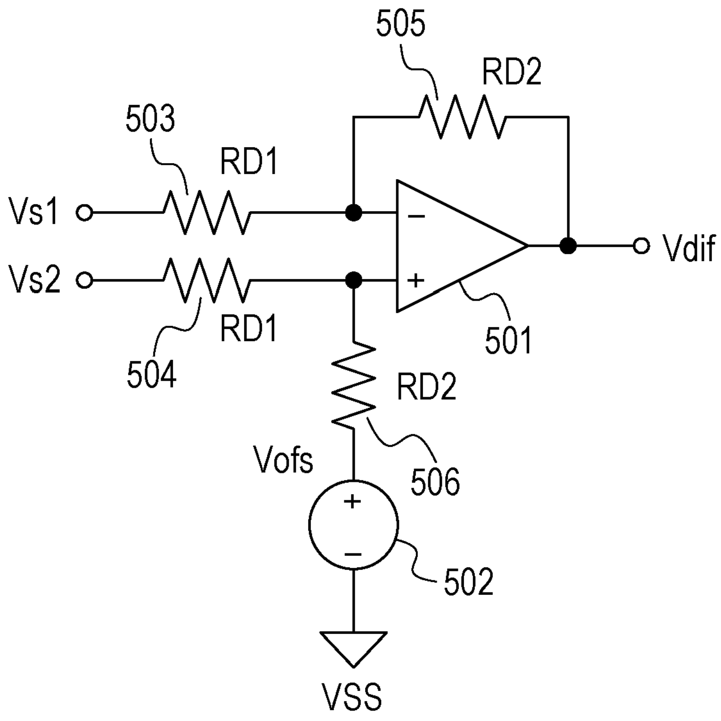
FIG. 5 is a circuit diagram illustrating a detailed circuit configuration of a differential amplifier.

FIG. 5 is a circuit diagram illustrating a detailed circuit configuration of the differential amplifier 330 disposed outside the ejection port array 101 of the recording element substrate 1. The differential amplifier 330 includes an operational amplifier 501, a constant voltage source 502, and resistors 503 to 506.

In each of the first to fourth blocks, the differential amplifier 330 amplifies a signal (differential signal) obtained by subtracting the temperature signal Vs1 expressed by Equation (2) from the temperature signal Vs2 expressed by Equation (4) at an amplification rate Gdif of the differential amplifier. Then, the differential amplifier 330 outputs a signal Vdif obtained by offsetting the amplified signal by a voltage Vofs of the constant voltage source 502 and expressed by the following Equation (5).

$$Vdif = Gdif(Vs2 - Vs1) + Vofs = Vofs - Gdif \cdot Tref \cdot Rs0 \cdot TCR \cdot (T2 - T1) \quad (5)$$

When resistance values of the resistors 503 and 504 are RD1, and resistance values of the resistors 505 and 506 are RD2, the amplification rate Gdif is expressed by the following Equation 6.

[Equation 6]

$$Gdif = \frac{RD2}{RD1} \quad (6)$$

Two types of noise are offset by the differential amplifier 330. The one type is noise superimposed on the temperature signals Vs1 and Vs2 in proportional to the constant current Iref indicated in Equations (2) and (4) due to a fluctuation in the current of the reference current source 307. The other type is crosstalk noise caused by a fluctuation in a voltage of a wiring intersecting the wirings V1 and V2 via a parasitic capacitance. Noise that remains in the signal Vdif and is not the above-described noise is suppressed by a low-pass filter 331 and output as a signal VF.

By comparing the signal VF with threshold voltages Vdth1 (first predetermined value) and Vdth2 (second predetermined value) based on two threshold signals Dth1 and Dth2, it can be determined whether ejection is misaligned ejection (whether ejection is diagonal ejection). That is, the signal VF is input to a positive terminal of a comparator 335 and compared with the threshold voltage Vdth1 input to a negative terminal of the comparator 335. When VF is greater than Vdth1, the comparator 335 outputs a signal at a high level (misaligned ejection) as a signal CMP1 to a wiring CMP1. When VF is equal to or less than Vdth1, the comparator 335 outputs a signal at a low level (normal ejection) as a signal CMP1 to the wiring CMP1.

The signal VF is input to a negative terminal of a comparator 339 and compared with the threshold voltage Vdth2 input to a positive terminal of the comparator 339. When Vdth2 is greater than VF, the comparator 339 outputs a signal at a high level (misaligned ejection) as a signal CMP2 to a wiring CMP2. When Vdth2 is equal to or less than VF, the comparator 339 outputs a signal at a low level (normal ejection) as a signal CMP2 to the wiring CMP2.

The thresholds voltages Vdth1 and Vdth2 can be set in 256 ranks from 0.5 V to 2.54 V in increments of 8 mV, for example. Set values Dth1 and Dth2 of the threshold voltages Vdth1 and Vdth2 are defined as 8-bit digital values that can be set in 256 ranks, for example. The set values Dth1 and Dth2 of the threshold voltages Vdth1 and Vdth2 are transferred to shift registers 332 and 336, respectively, from the signal generating unit 3 in synchronization with the clock signal CLK.

The threshold signal Dth1 is latched by a latch circuit 333 in synchronization with the latch signal LT and output to a voltage output type DAC 334. The output signal of the latch circuit 333 is held until the next latch timing. In a time period when the output signal of the latch circuit 333 is held, the next threshold signal Dth1 is transferred to the shift register 332. Similarly, the threshold signal Dth2 is latched by a latch circuit 336 in synchronization with the latch signal LT and output to a voltage output type DAC 338. The output signal of the latch circuit 338 is held until the next latch timing. In a time period when the output signal of the latch circuit 338 is held, the next threshold signal Dth2 is transferred to the shift register 336.

The signals CMP1 and CMP2 are input to an OR gate circuit 340 and output as a signal CMP to a wiring CMP. Since the signal CMP is input to a set input terminal of an RS latch circuit 341, a pulse signal of the signal CMP is held at a high level and output as a signal HCMP to a wiring HCMP. This signal HCMP is latched by a flip-flop circuit 342 using the latch signal LT as a trigger so that a determination result signal RSLT that is at a high level in the next latch period at the time of misaligned ejection is obtained.

Since an inverted signal of the latch signal LT is input to a reset input terminal of the RS latch circuit 341, the signal HCMP is reset at a falling edge of the latch signal LT.

Figure 14:
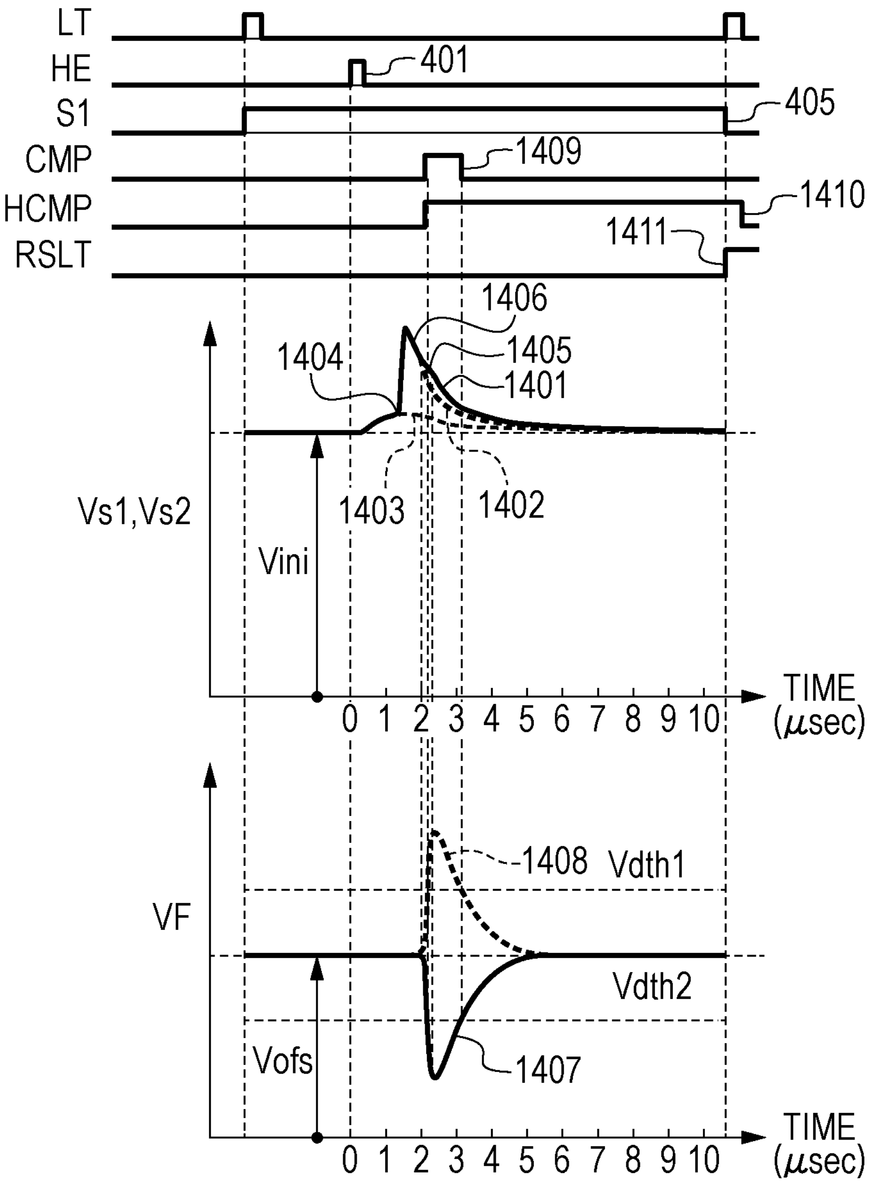
FIG. 14 is a timing chart illustrating each output waveform when liquid is diagonally ejected.

The determination result extracting unit 5 illustrated in FIG. 14 extracts the determination result signal RSLT together with the block signal BLE delayed by the latch period and the sensor selection signal SDATA in synchronization with a falling edge of the latch signal LT.

In the present embodiment, a determining circuit unit from the differential amplifier 330 to the flip-flop circuit 342 is disposed outside the ejection port array 301 in the recording element substrate 1, but may be disposed in a control chip included in a recording head outside the recording element substrate 1. In addition, the determining circuit unit may be disposed in a control chip included in a recording device outside the recording head.

Figure 6A:
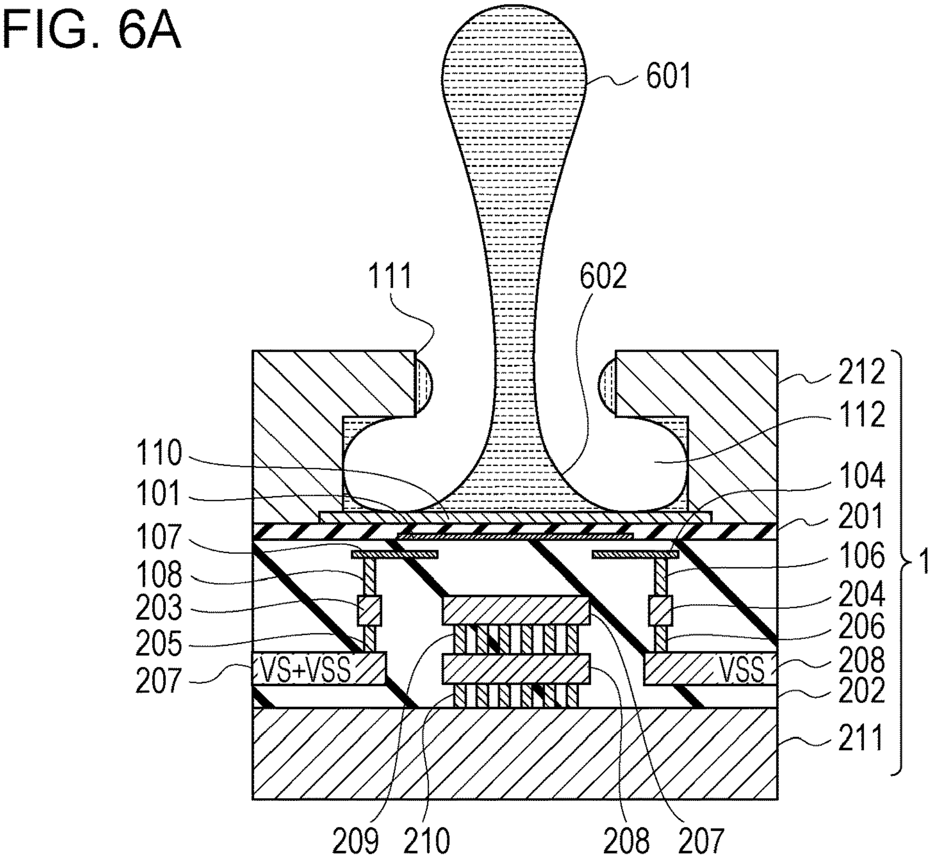
FIGS. 6A and 6B are schematic cross-sectional views illustrating states of the ejection port when liquid is normally ejected and when liquid is diagonally ejected.
Figure 6B:
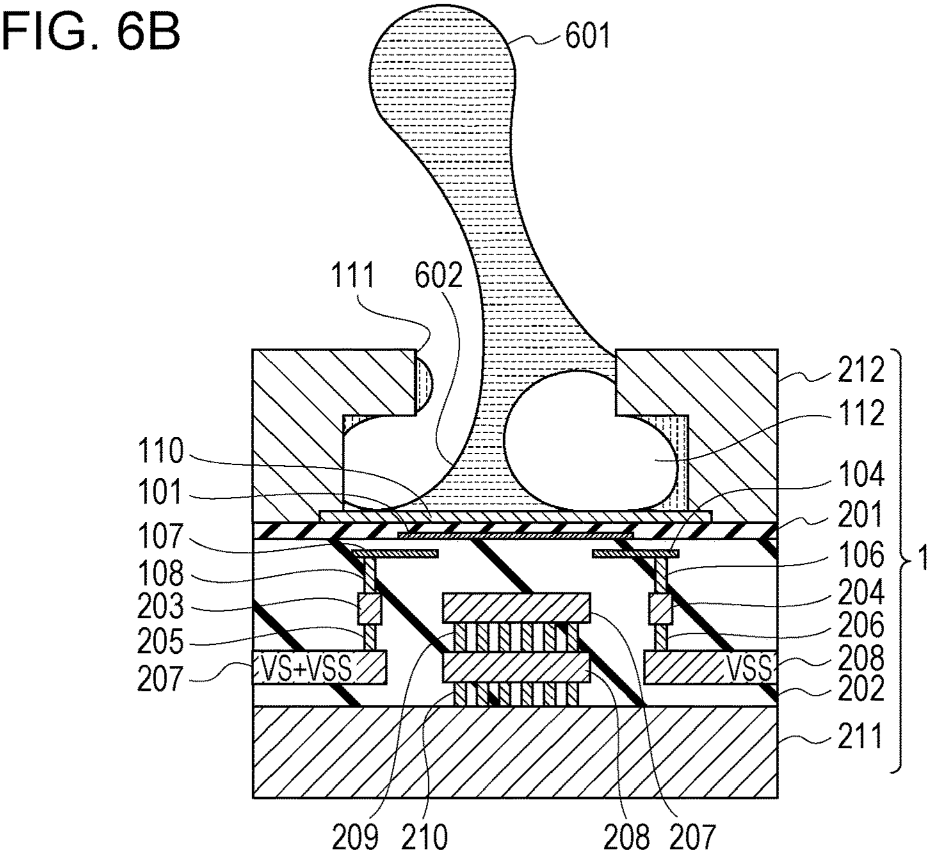
Figure 7B:
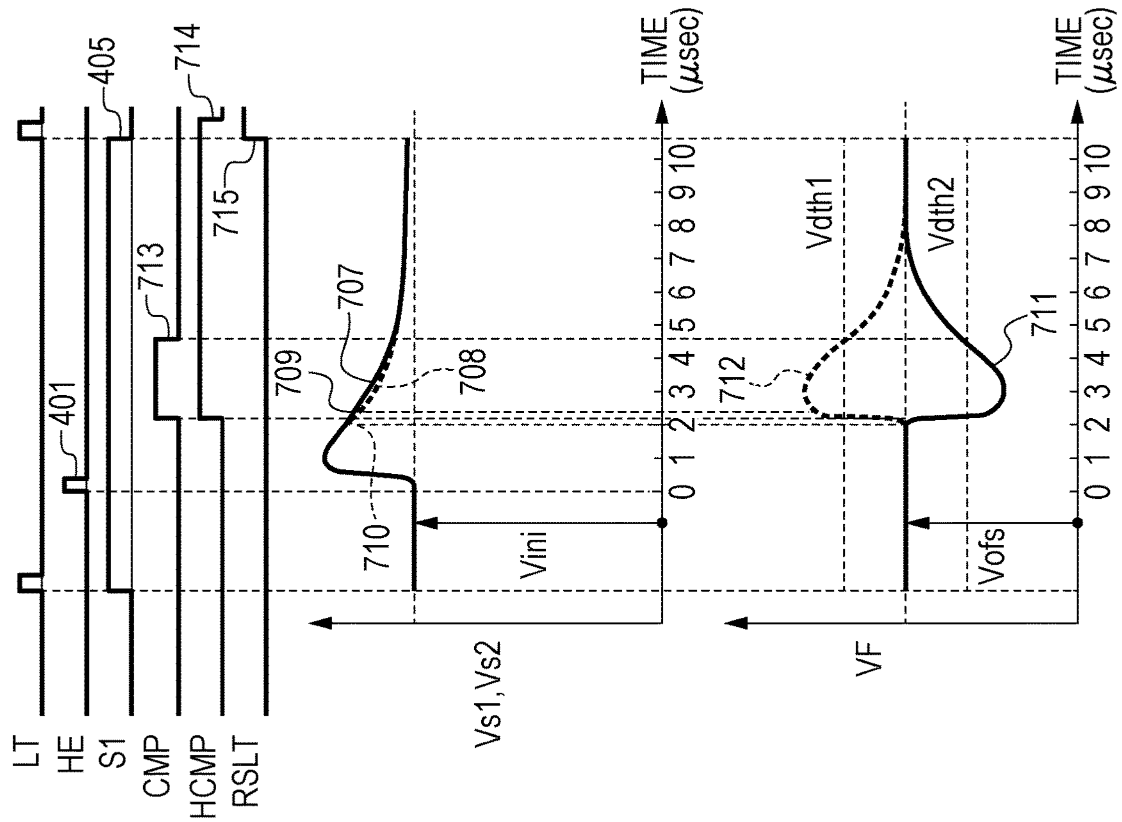
FIGS. 7A and 7B are timing charts illustrating each output waveform when liquid is normally ejected and when liquid is diagonally ejected.
Figure 7A:
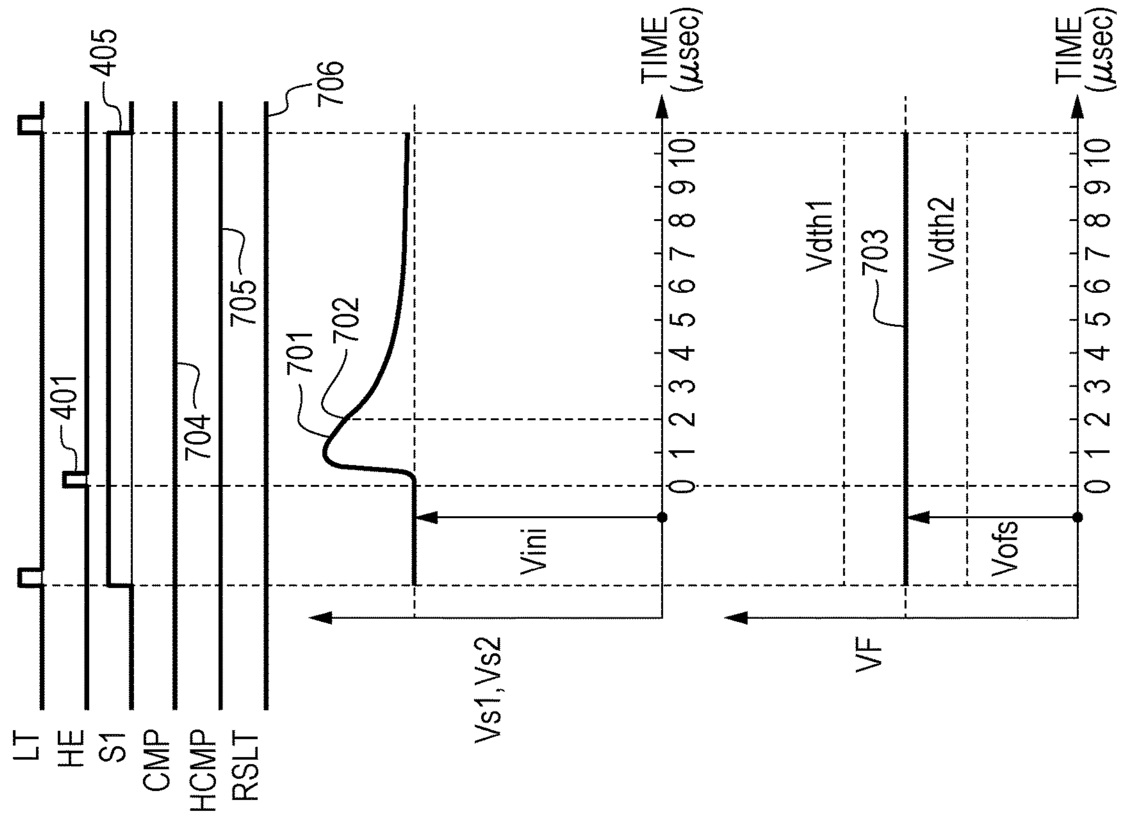

FIGS. 6A and 6B are schematic cross-sectional views of the ejection port in a state in which an ink droplet 601 is ejected from the ejection port 111 and a tailing 602 of the ink droplet 601 drops onto the cavitation-resistant film 110. FIG. 6A illustrates the normal ejection, and FIG. 6B illustrates the misaligned ejection. FIGS. 7A and 7B are timing charts illustrating each output waveform of the determining circuit unit of the recording element substrate 1 in the first block illustrated in FIG. 4. FIG. 7A illustrates the normal ejection and FIG. 7B illustrates the misaligned ejection. Similar timing charts are used for the other blocks and a description thereof is omitted in the present embodiment.

A difference between an operation of the determining circuit unit at the time of the normal ejection and an operation of the determining circuit unit at the time of the misaligned ejection in the first block in the present embodiment is described with reference to FIGS. 6A, 6B, 7A, and 7B. FIG. 6A is a schematic cross-sectional view of the ejection port at the time of the normal ejection, and the ink droplet (ejected liquid droplet) 601 is ejected in a direction perpendicular to a front surface of the orifice plate 212. Negative pressure within foamed bubbles acts symmetrically with respect to the tailing 602. Atmospheric communication of bubbles caused by the rupture of meniscus also occurs around the entire ejection port 111 at the same time, and the tailing 602 drops onto the center of the heater 101 as viewed in plan view.

Therefore, the dropped tailing 602 spreads symmetrically with respect to the heater 101 in plan view, and thus the temperature sensors 104 and 107 symmetrically arranged with respect to the heater 101 are evenly cooled by the tailing 602. Therefore, as illustrated in FIG. 7A, the output signals Vs1 and Vs2 of the temperature sensors 104 and 107 appear to overlap each other like a waveform 701. The waveform 701 increases in voltage from an initial voltage Vini due to heating to the heater 101 by a driving pulse 401 and indicates that the temperatures of the temperature sensors 104 and 107 start rapidly decreasing at a feature point 702 due to cooling by the drop of the tailing 602.

Since the output signals Vs1 and Vs2 are the same (T1=T2), the output signals Vs1 and Vs2 are offset together with the current fluctuation noise and the crosstalk noise according to Equation (5), and the output signal Vdif of the differential amplifier 330 becomes equal to the constant voltage Vofs. Therefore, as illustrated in FIG. 7A, the output signal VF of the low-pass filter 331 has a waveform 703 of the constant voltage Vofs. The threshold voltages Vdth1 and Vdth2 are set such that the difference between the threshold voltage Vdth1 and the constant voltage Vofs is equal to the difference between the threshold voltage Vdth2 and the constant voltage Vofs.

In FIG. 7A, since VF is equal to or greater than Vdth2 and equal to or less than Vdth1, each of the signals CMP1 and CMP2 is at a low level (normal ejection), and the output signal CMP of the OR gate circuit 340 is also at a low level such that a pulse is not generated (704). Therefore, the signal HCMP (705) and the determination result signal RSLT (706) are also at a low level (normal ejection) and are output to the determination result extracting unit 5.

On the other hand, FIG. 6B is a schematic cross-sectional view illustrating the ejection port at the time of the misaligned ejection and illustrating a state in which the ink droplet 601 is ejected and misaligned toward the left side with respect to the ejection direction illustrated in FIG. 6A. Negative pressure within foamed bubbles acts asymmetrically with respect to the tailing 602. Atmospheric communication of bubbles occurs asymmetrically from a location where meniscus is thin, and as a result, the tailing 602 is misaligned toward the left side from the center of the heater 101 and drops.

Therefore, the dropped tailing 602 is closer to the temperature sensor 107 and is farther away from the temperature sensor 104 in plan view than in the case illustrated in FIG. 6A, and thus the temperature sensor 107 is more strongly cooled by the tailing 602 than the temperature sensor 104. That is, as illustrated in FIG. 7B, a feature point 709 that appears in a waveform 707 of the output signal Vs1 of the temperature sensor 104 appears later than a feature point 710 that appears in a waveform 708 of the output signal Vs2 of the temperature sensor 107.

The speed at which the temperatures decrease after the feature temperature 709 is lower than the speed at which the temperatures decrease after the feature temperature 710, and the inclination of the waveform at the feature point 709 is gentler than the inclination of the waveform at the feature point 710.

However, an appearance time difference between the time when the feature point 710 appears and the time when the feature point 709 appears is small, a circuit that is a differential filter or the like and extracts the time when the feature points 709 and 710 appear is separately required, the accuracy of the circuit is low, and the circuit cannot detect the appearance time difference.

On the other hand, after the feature point 710, the waveform 708 of the output signal Vs2 is stably slightly lower than the waveform 707 of the output signal Vs1, and the signal Vdif amplified by taking the differential between the output signals of the waveforms 708 and 707 can be stably detected with high accuracy. Based on the signal Vdif, a misaligned ejection state is determined.

The output signal Vdif of the differential amplifier 330 decreases in voltage from the constant voltage Vofs after the feature point 710 according to Equation (5). Therefore, as illustrated in FIG. 7A, the output signal VF of the low-pass filter 331 has a waveform 711 in which the voltage decreases from the constant voltage Vofs after the feature point 710. The threshold voltages Vdth1 and Vdth2 are set such that the difference between the threshold voltage Vdth1 and the constant voltage Vofs is equal to the difference between the threshold voltage Vdth2 and the constant voltage Vofs.

In FIG. 7B, in a time period when Vdth2 is greater than VF, the signal CMP1 is at a low level, the signal CMP2 is at a high level (misaligned ejection), the output signal CMP of the OR gate circuit 340 is at a high level (misaligned ejection), and a pulse 713 is generated in the output signal CMP.

Therefore, a pulse 714 that holds the pulse 713 is generated in the signal HCMP, and the determination result signal RSLT (715) changes to a high level (misaligned ejection) and is output to the determination result extracting unit 5.

When the ink droplet 601 is ejected and misaligned toward the right side in a direction opposite to the direction illustrated in FIG. 6B, the waveforms 707 and 708 illustrated in FIG. 7B are interchanged, and the signal VF has a waveform 712 obtained by inverting the waveform 711 with respect to the constant voltage Vofs.

In this case, in a time period when VF is greater than Vdth1, the signal CMP1 is at a high level (misaligned ejection), the signal CMP2 is at a low level, the output signal CMP of the OR gate circuit 340 is at a high level (misaligned ejection), and a pulse 713 is generated in the output signal CMP in a similar manner to the case where the ink droplet 601 is misaligned toward the left side. Therefore, a pulse 714 that holds the pulse 713 is generated in the signal HCMP, the determination result signal RSLT (715) changes to a high level (misaligned ejection) and is output to the determination result extracting unit 5.

As described above, in the present embodiment, the constant current generated from the same reference constant current source is supplied to the two temperature sensors symmetrically arranged when the recording element substrate is viewed in plan view, and the signal is amplified by taking the differential between the signals of the constant current supply side terminals of the two temperature sensors. With this configuration, the amplification is performed while offsetting noise caused by a fluctuation in the current and crosstalk noise, and thus it is possible to detect, with high accuracy, even slightly misaligned ejection in a direction connecting the two temperature sensors.

Second Embodiment

Figure 8:
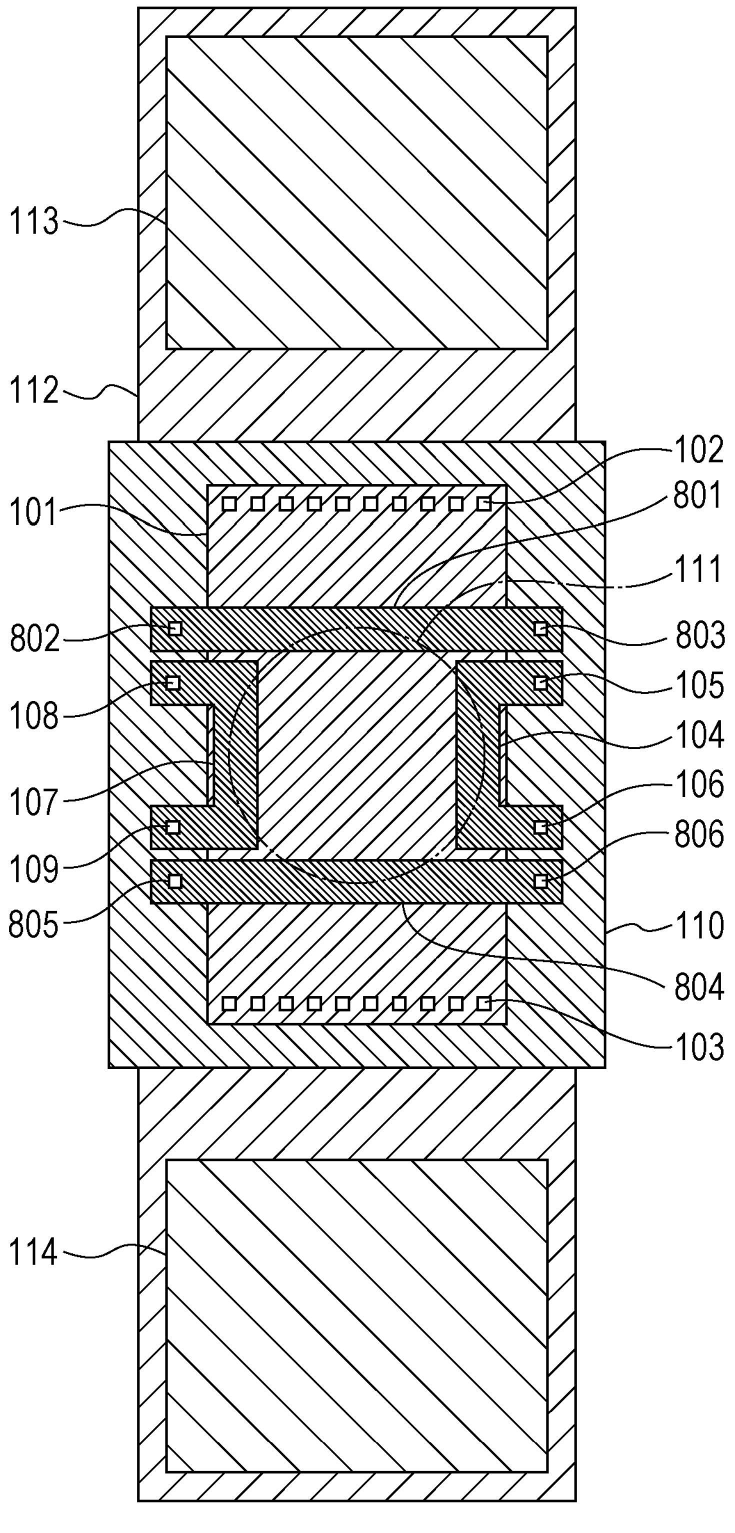
FIG. 8 is a plan view of two temperature detecting elements symmetrically arranged with respect to a longitudinal direction.

FIG. 8 is a plan view of an ejection port in which two temperature sensors 801 and 804 are added to the structure illustrated in FIG. 1 in the first embodiment and are symmetrically arranged in a longitudinal direction in a layer in which the two temperature sensors 104 and 107 are disposed as viewed in an ejection direction of ink from the substrate side.

As illustrated in FIG. 1, in the configuration in which the two temperature sensors 104 and 107 are symmetrically arranged in the vicinity of the centers of the longer sides of the heater 101, it is possible to stably detect a misaligned ejection state when a dropped tailing 602 is misaligned in a lateral direction in FIG. 1.

However, when the tailing 602 is misaligned in the longitudinal direction in FIG. 1, a misaligned ejection state cannot be detected even when the differential between the output signals of the temperature sensors 104 and 107 is taken.

Therefore, as illustrated in FIG. 8, in the present embodiment, the temperature sensors 801 and 804 are symmetrically arranged with respect to the center of the heater 101 in the longitudinal direction. In addition, four constant current sources, which are the constant current sources 309 and 310 and constant current sources corresponding to the added temperature sensors 801 and 804, are provided.

Even when the dropped tailing 602 is misaligned in the longitudinal direction, it is possible to detect a misaligned ejection state by taking the differential between output signals of the temperature sensors 801 and 804. In this case, threshold voltages Vdth1 and Vdth2 are set on the assumption of the signal VF when the dropped tailing 602 is misaligned in a diagonal direction in FIG. 8.

Third Embodiment

Figure 9:
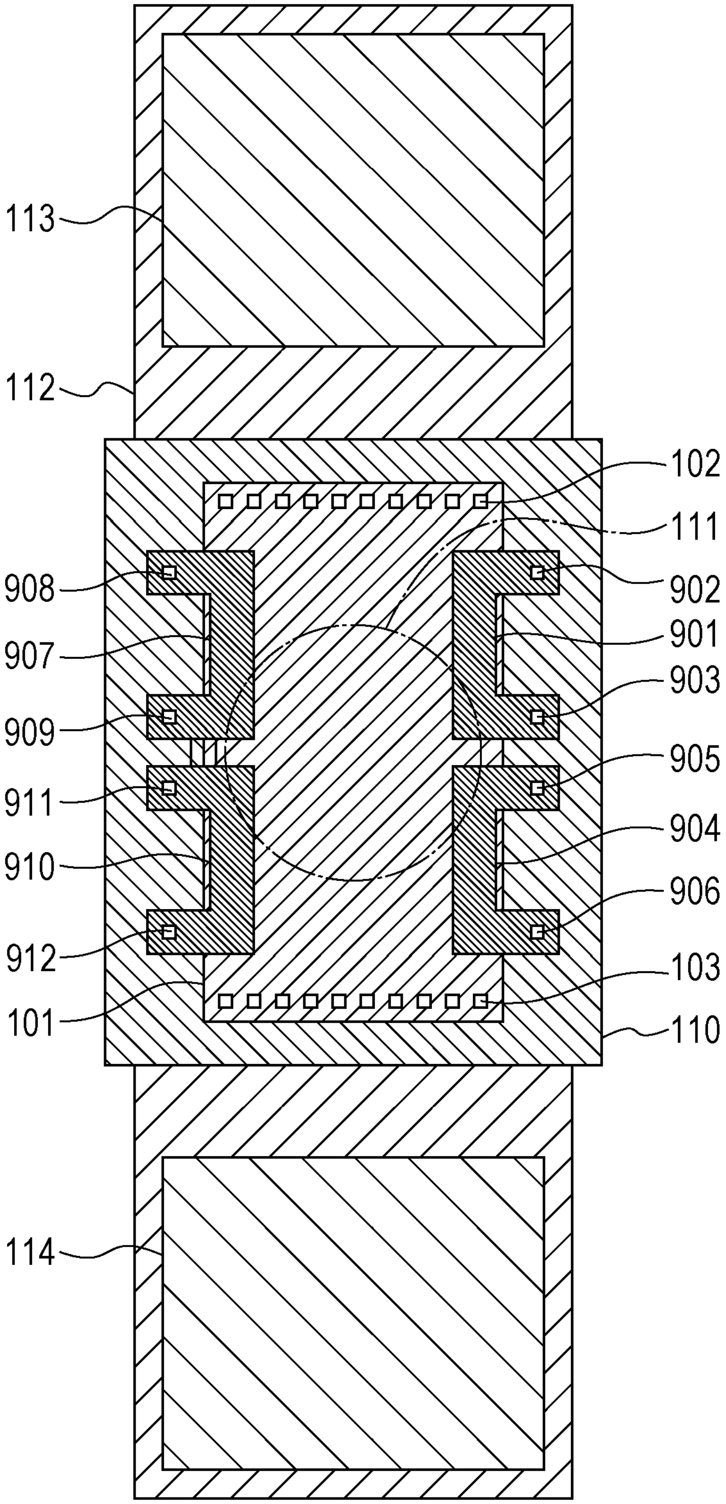
FIG. 9 is a plan view of four temperature detecting elements symmetrically arranged.

FIG. 9 is a plan view of an ejection port in which four temperature sensors 901, 904, 907, and 910 are disposed so as to be symmetrical with each other with respect to a heater 101 such that the temperature sensors 901, 904, 907, and 910 overlap longer sides of the heater 101 among a plurality of ejection ports disposed in a recording element substrate 1 as viewed in an ejection direction of ink from the substrate side. Four constant current sources that supply a current to the four temperature sensors are provided for the four temperature sensors.

As illustrated in FIG. 9, since two temperature sensors are symmetrically arranged on each of the longer sides of heater 101, it is possible to obtain effects similar to those obtained in the second embodiment. That is, when at least one of a differential signal VF1 between the output of the temperature sensor 901 and the output of the temperature sensor 907 and a differential signal VF2 between the output of the temperature sensor 904 and the output of the temperature sensor 910 exceeds a threshold voltage, it is determined that misaligned ejection in the lateral direction occurs.

Similarly, when at least one of a differential signal VF3 between the output of the temperature sensor 901 and the output of the temperature sensor 904 and a differential signal VF4 between the output of the temperature sensor 907 and the output of the temperature sensor 910 exceeds a threshold voltage separately set, it is determined that misaligned ejection in the longitudinal direction occurs.

Alternatively, a differential signal VF5 between the output of the temperature sensor 901 and the output of the temperature sensor 910 and a differential signal VF6 between the output of the temperature sensor 904 and the output of the temperature sensor 907 may be compared with a threshold voltage separately set. In this case, when either the differential signal VF5 or the differential signal VF6 exceeds the threshold voltage, it is determined that misaligned ejection in a diagonal direction occurs. When both the differential signals VF5 and VF6 exceed the threshold voltage, misaligned ejection in the lateral or longitudinal direction occurs.

Fourth Embodiment

Figure 10:
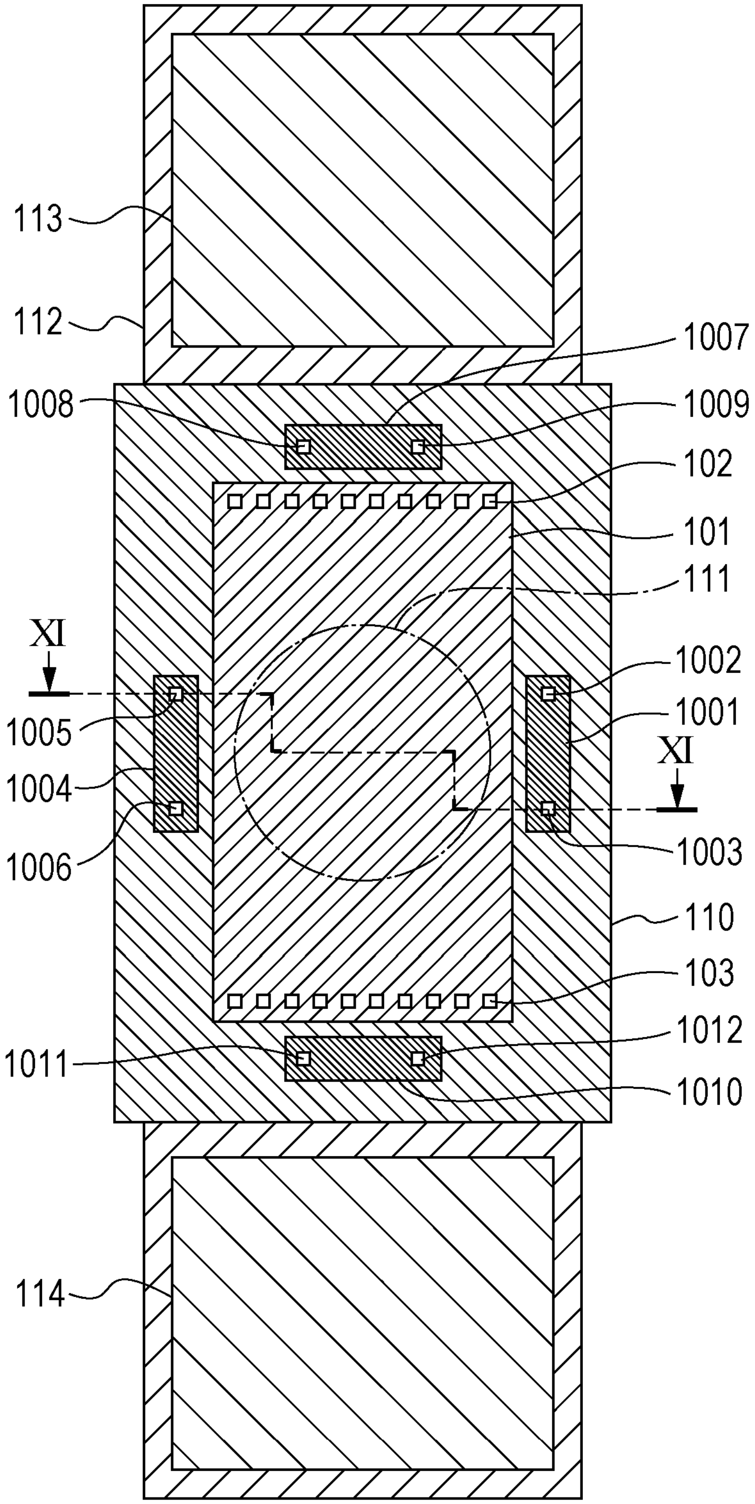
FIG. 10 is a plan view of four temperature detecting elements symmetrically arranged in a layer in which a heating element is disposed.

FIG. 10 is a plan view of an ejection port in which two temperature sensors 1001 and 1004 are symmetrically arranged with respect to a heater 101 along a longitudinal direction of the heater 101 and two temperature sensors 1007 and 1010 are symmetrically arranged with respect to the heater 101 along a transverse direction of the heater 101 in a layer in which the heater 101 is disposed, as viewed in an ejection direction of ink from a substrate side.

Figure 11:
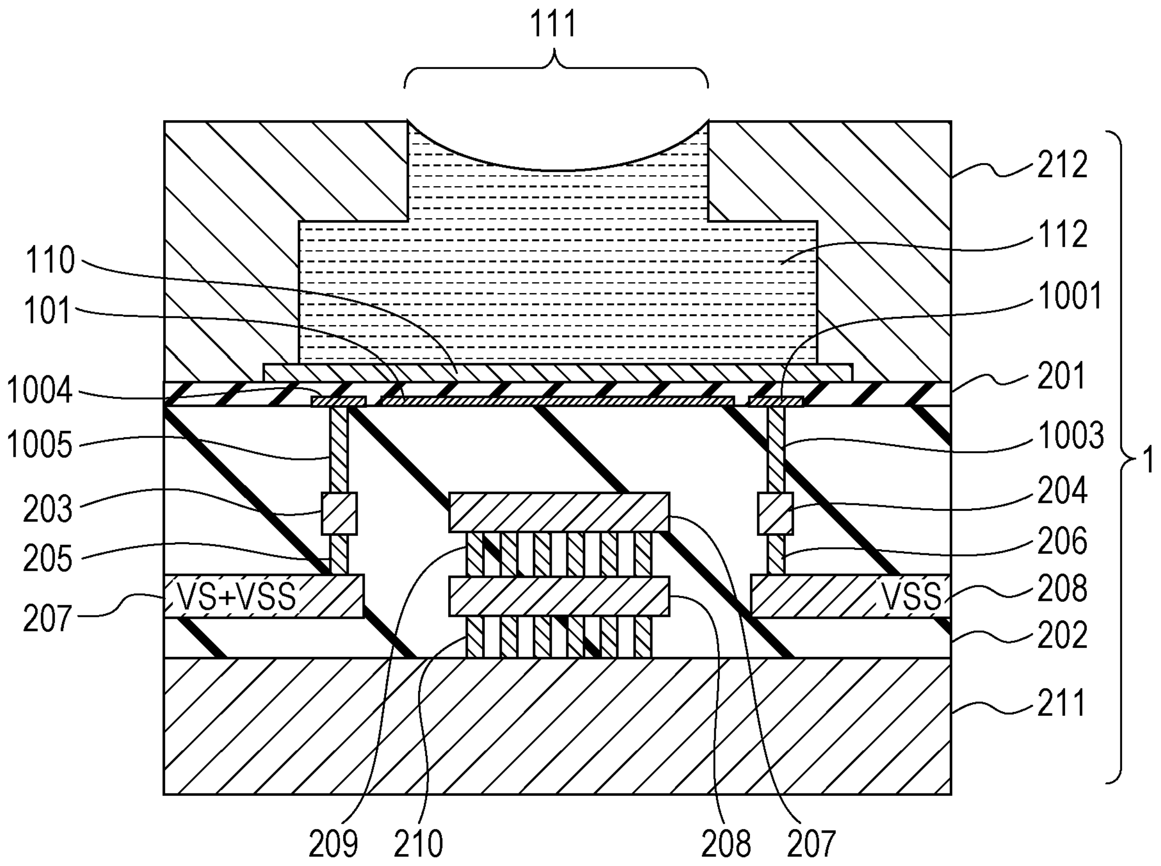
FIG. 11 is a cross-sectional view taken along line XI-XI illustrated in FIG. 10.

The four temperature sensors 1001, 1004, 1007, and 1010 are arranged so as to overlap an ink flow path 112 in the plan view of FIG. 10. FIG. 11 is a cross-sectional view taken along line XI-XI in FIG. 10 and illustrating the ejection port illustrated in FIG. 10. As illustrated in FIG. 10, the four temperature sensors 1001, 1004, 1007, and 1010 can be made of the same material as that of the heater 101 to increase sheet resistance, have a short length to acquire temperatures in a narrower range, and be relatively freely arranged.

In addition, as illustrated in FIG. 11, the four temperature sensors can be closer to the ink flow path 112 than the temperature sensors illustrated in FIG. 2A are, and can improve sensitivity to cooling by a dropped tail 602 while receiving heat from the heater 101. In addition, since the four temperature sensors 1001, 1004, 1007, and 1010 are symmetrically arranged in the longitudinal and lateral directions, it is possible to obtain effects similar to those obtained in the second embodiment.

Fifth Embodiment

Figure 12:
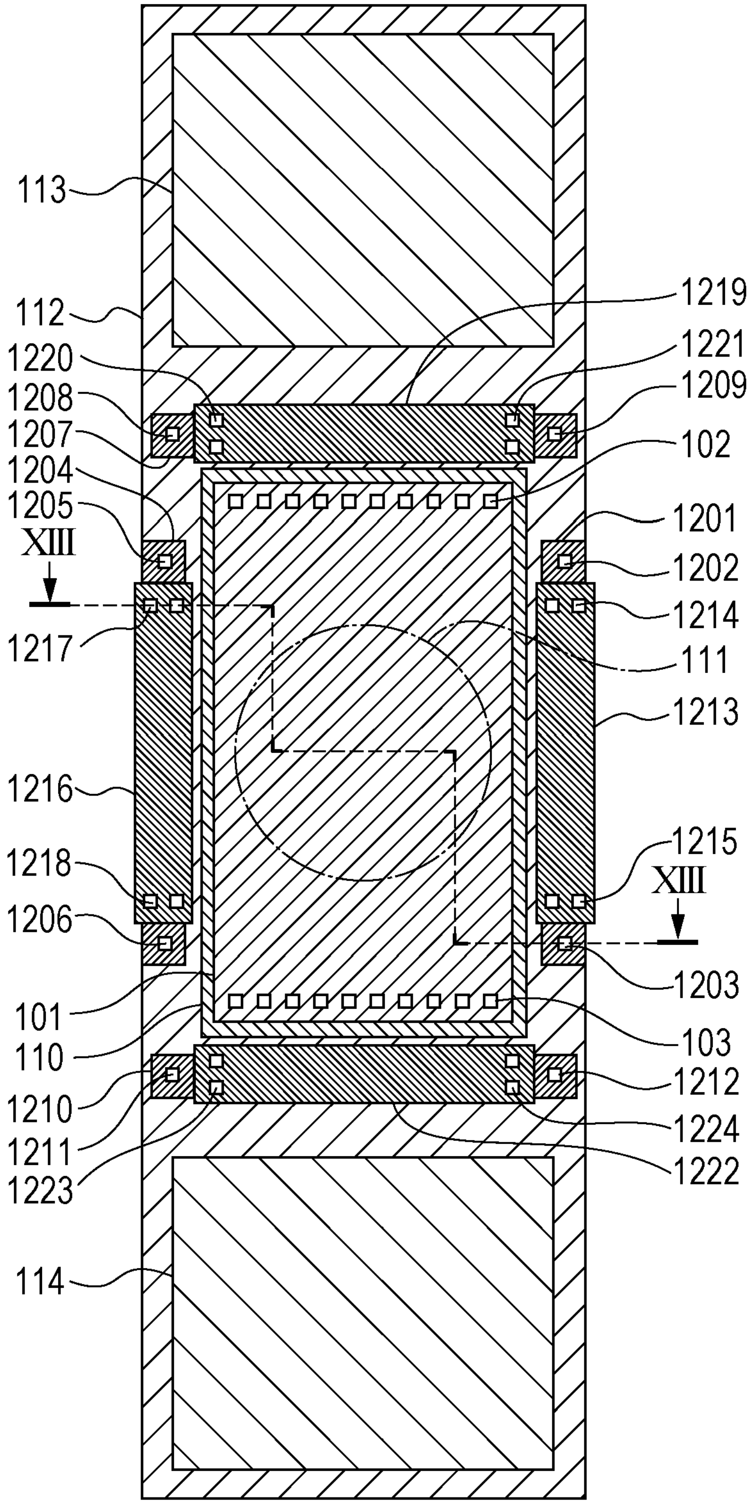
FIG. 12 is a plan view of four temperature detecting elements symmetrically arranged in a layer in which a cavitation-resistant film is disposed.
Figure 13:
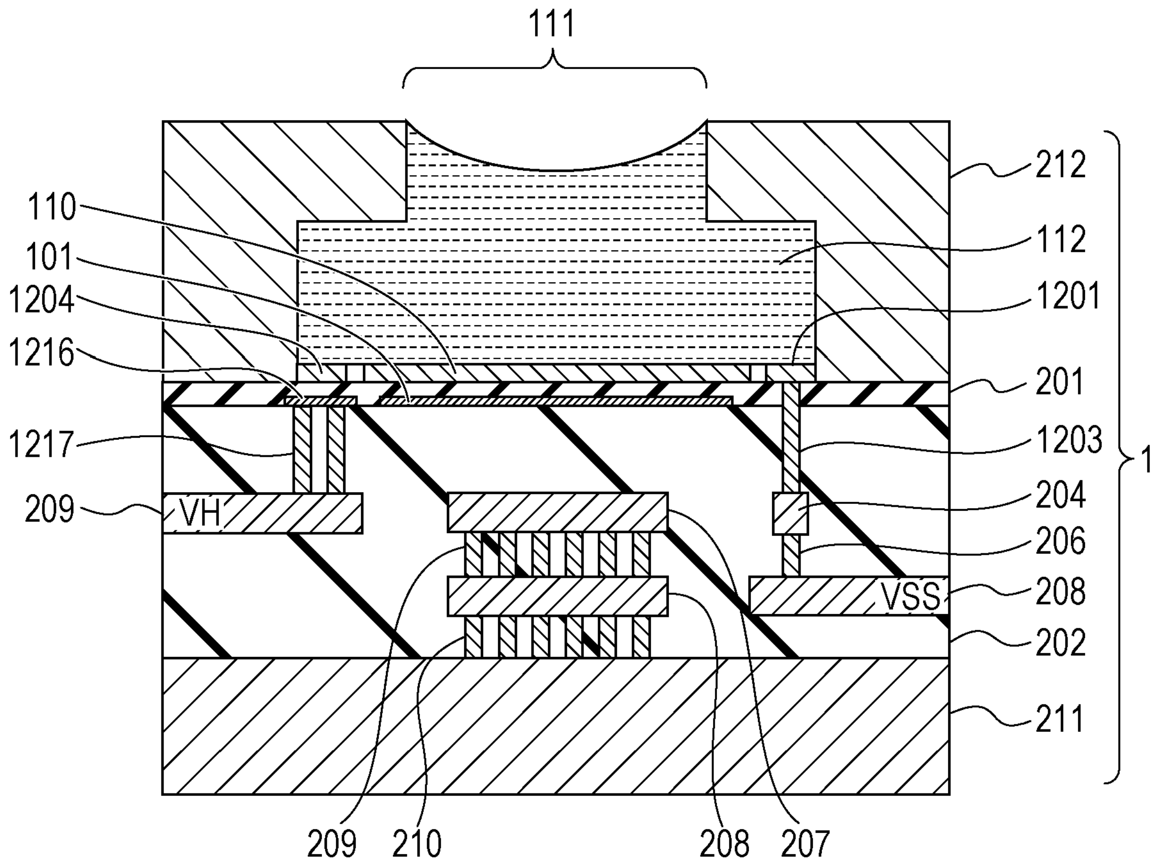
FIG. 13 is a cross-sectional view taken along line XIII-XIII illustrated in FIG. 12.

FIG. 12 is a plan view of an ejection port in which four temperatures 1201, 1204, 1207, and 1210 are symmetrically arranged with respect to a heater 101 and adjacent to the centers of longer sides and shorter sides of the heater 101 in plan view in a layer in which a cavitation-resistant film 110 is disposed. FIG. 13 is a cross-sectional view taken along line XIII-XIII in FIG. 12 and illustrating the ejection port illustrated in FIG. 12.

The cavitation-resistant film 110 is provided so as to cover a minimum required range to protect the heater 101 from cavitation. Gaps between the cavitation-resistant film 110 and the four temperature sensors 1201, 1204, 1207, and 1210 are set to be minimal. The temperature sensors are arranged so as to overlap an ink flow path 112 in the plan view of FIG. 12.

In the arrangement described above, the four temperature sensors can be arranged closest to the heater 101. However, distances from the heater 101 to the four temperature sensors are too long to receive heat from the heater 101.

To avoid this, four auxiliary heaters (auxiliary heating elements) 1213, 1216, 1219, and 1222 for heating the temperature sensors immediately before appearance of a significant difference between output signals of a pair of temperature sensors from which a differential is taken are disposed in a layer in which the heater 101 is disposed.

The auxiliary heater 1213 is provided to heat the temperature sensor 1201. The auxiliary heater 1216 is provided to heat the temperature sensor 1204. The auxiliary heater 1219 is provided to heat the temperature sensor 1207. The auxiliary heater 1222 is provided to heat the temperature sensor 1210. The four auxiliary heaters are connected via a conductive plug to the same power supply line as a power supply line that is present in a second layer and to which the heater 101 is connected via a conductive plug.

FIG. 14 is a timing chart illustrating each output waveform of a determining circuit unit of a recording element substrate 1 at the time of misaligned ejection in the first block illustrated in FIG. 4 in the present embodiment. As illustrated in FIG. 6B, an ink droplet 601 is misaligned toward the left side in the lateral direction.

When the temperature sensors 1201 and 1204 are not heated by the auxiliary heaters, sensitivity sufficient to detect misaligned ejection is not obtained as indicated by a waveform 1403 illustrated in FIG. 14. Therefore, the auxiliary heaters heat the temperature sensors 1201 and 1204 before a pulse 1409 appears in a signal CMP so that output waveforms of the temperature sensors indicate rapid increases in the temperatures after a temperature rise point 1404 and sufficient sensitivity is obtained.

A waveform 1401 after the temperature rise point 1404 indicates an output signal Vs1 of the temperature sensor 1201, and a waveform 1402 after the temperature rise point 1404 indicates an output signal Vs2 of the temperature sensor 1204.

As illustrated in FIG. 6B, since a dropped tailing 602 is misaligned toward the left side, a feature point 1405 that appears in the waveform 1401 appears later than a feature point 1406 that appears in the waveform 1402. In addition, the speed at which the temperature decreases after the feature point 1405 is lower than the speed at which the temperature decreases after the feature point 1406, and the inclination of the waveform after the feature point 1405 is gentler than the inclination of the waveform after the feature point 1406.

After the feature point 1406, since the waveform 1402 of the output signal Vs2 is lower than the waveform 1401 of the output signal Vs1, an output signal Vdif of a differential amplifier 330 decreases from a constant voltage Vofs after a feature point 710 according to Equation (5). Therefore, an output signal VF of a low-pass filter 331 has a waveform 1407 that decreases in voltage from the constant voltage Vofs after the feature point 1406 as illustrated in FIG. 14.

Threshold voltages Vdth1 and Vdth2 are set such that the difference between the threshold voltage Vdth1 and the constant voltage Vofs is equal to the difference between the threshold voltage Vdth1 and the constant voltage Vofs.

In FIG. 14, in a time period when Vdth2 is greater than VF, a signal CMP1 is at a low level, a signal CMP2 is at a high level (misaligned ejection), an output signal CMP of an OR gate circuit 340 is at a high level (misaligned ejection), and a pulse 1409 is generated in the output signal CMP. Therefore, a pulse 1410 that holds the pulse 1409 is generated in a signal HCMP, and a determination result signal RSLT (1411) changes to a high level (misaligned ejection) and is output to a determination result extracting unit 5.

In the present embodiment, since the temperature sensors are disposed to be in contact with the ink flow path 112 as illustrated in FIG. 13, the temperature sensors have high sensitivity to cooling by a dropped tailing 602 while receiving heat from the auxiliary heaters. In addition, since the four temperature sensors 1201, 1204, 1207, and 1210 are symmetrically arranged in the longitudinal and lateral directions, it is possible to obtain effects similar to those obtained in the second exemplary embodiment.

OTHER EMBODIMENTS

Although the first to fifth embodiments are described above, the present disclosure is not limited to the above-described values and the above-described embodiments. For example, a layer in which the two temperature sensors are disposed so as to be symmetrical with each other in the lateral direction with respect to the heater may be different from a layer in which the two temperature sensors are disposed so as to be symmetrical with each other in the longitudinal direction with respect to the heater.

In addition, even when positions where two temperature sensors are disposed are symmetrical with respect to the heater, the shapes of the two temperature sensors may not be symmetrical. Furthermore, the number of ejection ports of each ejection array may not be limited to 4 and may be, for example, 512. The ejection array itself may not be a single array and may include a plurality of arrays.

According to the present disclosure, it is possible to a liquid ejecting apparatus that can detect whether a liquid droplet is diagonally ejected.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-158381 filed Sep. 28, 2021, which is hereby incorporated by reference herein in its entirety.

What is claimed is:

1. A liquid ejecting apparatus comprising:

a recording element substrate including an ejection port that ejects liquid, and a heating element that heats the liquid in order to eject the liquid from the ejection port;

at least a first temperature detecting element and a second temperature detecting element, wherein the first temperature detecting element and the second temperature detecting element are formed at target positions centered on the center of the heating element when the recording element substrate is viewed in plan view;

a first constant current source and a second constant current source that generate a constant current from a same reference current source;

a first switching unit that switches whether the current from the first constant current source is supplied to the first temperature detecting element;

a second switching unit that switches whether the current from the second constant current source is supplied to the second temperature detecting element; and a differential signal output unit that outputs a differential signal between an output signal from the first temperature detecting element and an output signal from the second temperature detecting element.

2. The liquid ejecting apparatus according to claim 1, wherein a ratio of a distance from the center of the second temperature detecting element to the center of the heating element to a distance from the center of the first temperature detecting element to the center of the heating element is 0.95 or higher and 1.05 or lower when the recording element substrate is viewed in plan view.

3. The liquid ejecting apparatus according to claim 1, further comprising a determining circuit unit that compares the differential signal with a set threshold voltage to determine whether the liquid is diagonally ejected from the ejection port.

4. The liquid ejecting apparatus according to claim 3, wherein the determining circuit unit determines that the liquid is diagonally ejected from the ejection port when the differential signal is greater than a first set threshold voltage or less than a second set threshold voltage.

5. The liquid ejecting apparatus according to claim 1, wherein the first temperature detecting element and the second temperature detecting element are arranged in a transverse direction of the heating element.

6. The liquid ejecting apparatus according to claim 1, wherein the first temperature detecting element and the second temperature detecting element are arranged in a longitudinal direction of the heating element.

7. The liquid ejecting apparatus according to claim 1, wherein, the first temperature detecting element and the second temperature detecting element are formed at positions where the first temperature detecting element and the second temperature detecting element do not overlap the heating element when the recording element substrate is viewed in plan view.

8. The liquid ejecting apparatus according to claim 1, wherein the first temperature detecting element and the second temperature detecting element are thin film resistors formed in a lower layer present below the heating element via an insulating layer.

9. The liquid ejecting apparatus according to claim 1, wherein the first temperature detecting element and the second temperature detecting element are thin film resistors formed in a layer in which the heating element is disposed.

10. The liquid ejecting apparatus according to claim 1, wherein the first temperature detecting element and the second temperature detecting element are thin film resistors formed in a layer in which a cavitation-resistant film is disposed.

11. The liquid ejecting apparatus according to claim 1, further comprising an auxiliary heating element that heats the first temperature detecting element and the second temperature detecting element.

* * * * *